United States Patent
Kee et al.

(10) Patent No.: US 12,205,030 B2
(45) Date of Patent: *Jan. 21, 2025

(54) OBJECT DETECTION AND PROPERTY DETERMINATION FOR AUTONOMOUS VEHICLES

(71) Applicant: Aurora Operations, Inc., Pittsburgh, PA (US)

(72) Inventors: Eric Randall Kee, Pittsburgh, PA (US); Carlos Vallespi-Gonzalez, Pittsburgh, PA (US); Gregory P. Meyer, Pittsburgh, PA (US); Ankit Laddha, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,025

(22) Filed: Oct. 30, 2023

(65) Prior Publication Data

US 2024/0144010 A1  May 2, 2024

Related U.S. Application Data

(63) Continuation of application No. 17/516,159, filed on Nov. 1, 2021, now Pat. No. 11,836,623, which is a
(Continued)

(51) Int. Cl.
*G06V 10/00* (2022.01)
*G05D 1/00* (2006.01)
(Continued)

(52) U.S. Cl.
CPC ............ *G06N 3/08* (2013.01); *G05D 1/0088* (2013.01); *G06F 18/217* (2023.01);
(Continued)

(58) Field of Classification Search
CPC ............ G06N 3/02; G06N 3/08; G06N 3/092; G06N 3/082; G06N 3/042; G06N 3/045;
(Continued)

(56) References Cited

U.S. PATENT DOCUMENTS 8,195,394 B1   6/2012   Zhu et al.
8,558,679 B2  10/2013   Bargman et al.
(Continued)

OTHER PUBLICATIONS

Chen, et al. "Multi-View 3D Object Detection Network for Autonomous Driving", arXiv: 1611.07759v2, Apr. 11, 2017, 9 pages.
(Continued)

*Primary Examiner* — Amir Alavi
(74) *Attorney, Agent, or Firm* — Dority & Manning, P.A.

(57) ABSTRACT

Systems, methods, tangible non-transitory computer-readable media, and devices for detecting objects are provided. For example, the disclosed technology can obtain a representation of sensor data associated with an environment surrounding a vehicle. Further, the sensor data can include sensor data points. A point classification and point property estimation can be determined for each of the sensor data points and a portion of the sensor data points can be clustered into an object instance based on the point classification and point property estimation for each of the sensor data points. A collection of point classifications and point property estimations can be determined for the portion of the sensor data points clustered into the object instance. Furthermore, object instance property estimations for the object instance can be determined based on the collection of point classifications and point property estimations for the portion of the sensor data points clustered into the object instance.

20 Claims, 11 Drawing Sheets

Related U.S. Application Data continuation of application No. 16/038,740, filed on Jul. 18, 2018, now Pat. No. 11,164,016.

(60) Provisional application No. 62/672,745, filed on May 17, 2018.

(51) Int. Cl.
| | |
|---|---|
| *G06F 18/21* | (2023.01) |
| *G06F 18/2321* | (2023.01) |
| *G06N 3/02* | (2006.01) |
| *G06N 3/08* | (2023.01) |
| *G06V 10/762* | (2022.01) |
| *G06V 10/776* | (2022.01) |
| *G06V 20/58* | (2022.01) |

(52) U.S. Cl.
CPC ............ *G06F 18/2321* (2023.01); *G06N 3/02* (2013.01); *G06V 10/763* (2022.01); *G06V 10/776* (2022.01); *G06V 20/58* (2022.01)

(58) Field of Classification Search
CPC .... G06N 3/047; G06N 3/0475; G06N 3/0454; G06V 20/08; G06V 20/58; G06V 10/763; G06V 10/776; G05D 1/02; G05D 1/0088; G06F 18/217; G06F 18/2321
See application file for complete search history.

(56) References Cited

U.S. PATENT DOCUMENTS

| | | | |
|---|---|---|---|
| 8,744,741 B2 | 6/2014 | Brimble et al. | |
| 8,886,382 B2 | 11/2014 | Nettleton et al. | |
| 9,704,043 B2* | 7/2017 | Schnittman | G05D 1/0088 |
| 9,740,944 B2* | 8/2017 | Micks | G06V 10/776 |
| 9,956,910 B2 | 5/2018 | McNew | |
| 9,996,082 B2 | 6/2018 | Glatfelter | |
| 10,054,678 B2 | 8/2018 | Mei et al. | |
| 10,108,867 B1 | 10/2018 | Vallespi-Gonzalez et al. | |
| 10,185,998 B1 | 1/2019 | Konrardy et al. | |
| 10,255,525 B1 | 4/2019 | Totolos, Jr. et al. | |
| 10,310,087 B2 | 6/2019 | Laddha et al. | |
| 10,328,934 B2 | 6/2019 | Minster | |
| 10,429,194 B2 | 10/2019 | Wheeler | |
| 10,468,062 B1* | 11/2019 | Levinson | G01S 7/497 |
| 10,482,379 B2* | 11/2019 | Holt | G06N 3/045 |
| 10,527,417 B2 | 1/2020 | Chen et al. | |
| 10,535,138 B2* | 1/2020 | Pfeiffer | G06V 20/56 |
| 10,580,158 B1 | 3/2020 | Mousavian et al. | |
| 11,010,615 B2 | 5/2021 | Rasmusson et al. | |
| 11,164,016 B2* | 11/2021 | Kee | G06F 18/217 |
| 11,237,811 B2 | 2/2022 | Chen | |
| 11,458,972 B2 | 10/2022 | Kim | |
| 11,532,168 B2* | 12/2022 | Smolyanskiy | G01S 17/89 |
| 11,548,452 B2 | 1/2023 | Ha | |
| 11,651,244 B2* | 5/2023 | Viswanathan | G01C 21/28 706/12 |
| 11,836,623 B2* | 12/2023 | Kee | G06V 20/58 |
| 12,039,663 B2* | 7/2024 | Wang | B60W 60/001 |
| 12,051,206 B2* | 7/2024 | Chen | G06T 5/50 |
| 2018/0328750 A1 | 11/2018 | Yun et al. | |
| 2019/0354782 A1 | 11/2019 | Kee et al. | |
| 2020/0394813 A1 | 12/2020 | Theverapperuma et al. | |
| 2021/0124348 A1 | 4/2021 | Hyde et al. | |
| 2022/0076078 A1* | 3/2022 | Vdovjak | G06N 3/08 |

OTHER PUBLICATIONS

Li, et al. "Vehicle Detection from 3D Lidar Using Fully Convolutional Network", arXiv: 1608.07916, Apr. 11, 2017, 8 pages.

Petrovskay A et al., Model Based Vehicle Tracking for Autonomous Driving in Urban Environments, Proceedings of robotics: Science and systems IV, Zurich, Switzerland, 2008, 8 pages.

Zelener, Survey of Object Classification in 3D Range Scans, Technical Report, 2015, 32 pages.

Kendall, et al., "What Uncertainties Do We Need in Bayesian Deep Learning for Computer Vision?", NIPS 2017, 11 pages.

* cited by examiner

OBJECT DETECTION AND PROPERTY DETERMINATION FOR AUTONOMOUS VEHICLES

PRIORITY CLAIM

The present application is a continuation of U.S. application Ser. No. 17/516,159 having a filing date of Nov. 21, 2021 (now issued as U.S. Pat. No. 11,836,623 on Dec. 5, 2023), which is a continuation of U.S. application Ser. No. 16/038,740 having a filing date of Jul. 18, 2018 (now issued as U.S. Pat. No. 11,164,016 on Nov. 2, 2021), which is based on and claims benefit of U.S. Provisional Patent Application No. 62/672,745 having a filing date of May 17, 2018. Applicant claims priority to and the benefit of each of such applications and incorporates all such applications herein by reference in its entirety.

FIELD

The present disclosure relates generally to the operation of an autonomous vehicle including detection and tracking of objects.

BACKGROUND

Vehicles, including autonomous vehicles, can receive sensor data that is used to determine the state of an environment through which the vehicle travels. However, the state of objects in the environment is dynamic and subject to change over time. Additionally, the types of objects in the environment can change over time as can the position of those objects. As such, the safe operation of an autonomous vehicle depends on the detection and tracking of these objects over time. However, existing ways of detecting and tracking objects may lack a sufficient level of speed, precision, and accuracy. Accordingly, there exists a need for a way to more effectively detect and track objects proximate to the autonomous vehicle.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of detecting objects. The computer-implemented method of detecting objects can include obtaining, by a computing system including one or more computing devices, a representation of sensor data associated with an environment surrounding an autonomous vehicle. The representation of sensor data can include a plurality of sensor data points. The method can include determining, by the computing system, a point classification and point property estimation for each of the plurality of the sensor data points. Further, the method can include clustering, by the computing system, a portion of the plurality of sensor data points into an object instance based at least in part on the point classification and point property estimation for each of the plurality of the sensor data points. The method can include determining, by the computing system, a collection of point classifications and point property estimations for the portion of the plurality of sensor data points clustered into the object instance. The method can also include determining, by the computing system, one or more object instance property estimations for the object instance based at least in part on the collection of point classifications and point property estimations for the portion of the plurality of sensor data points clustered into the object instance.

Another example aspect of the present disclosure is directed to an object detection system, including: one or more processors; a machine-learned detector model configured to receive a representation of sensor data and, in response to receipt of the representation of sensor data, determine a point classification and point property estimation for a plurality of sensor data points, cluster a portion of the plurality of sensor data points into an object instance based at least in part on the point classification and point property estimation for the plurality of sensor data points, and output one or more object instance property estimations for the object instance that are determined at least in part from the point classifications and point property estimations for the portion of the plurality of sensor data points clustered into the object instance; and at least one tangible, non-transitory computer readable medium that stores instructions that, when executed by the one or more processors, cause the one or more processors to perform operations. The operations can include obtaining a representation of sensor data associated with an environment surrounding an autonomous vehicle. The representation of sensor data can include a plurality of sensor data points. The operations can also include inputting the representation of sensor data into the machine-learned detector model. Furthermore, the operations can include receiving, as output of the machine-learned detector model, one or more object instance property estimations associated with an object instance detected within the representation of sensor data.

Another example aspect of the present disclosure is directed to an autonomous vehicle, including: a sensor system including at least one LIDAR sensor configured to transmit ranging signals relative to the autonomous vehicle and to generate LIDAR data; and a vehicle computing system including: one or more processors; and at least one tangible, non-transitory computer readable medium that stores instructions that, when executed by the one or more processors, cause the one or more processors to perform operations. The operations can include receiving LIDAR data from the sensor system. Further, the operations can include generating a data matrix comprising a plurality of data channels based at least in part on the LIDAR data. The operations can also include providing the data matrix including a plurality of data channels as input to a machine-learned detector model configured to receive a data matrix of LIDAR data and, in response to receipt of the data matrix of LIDAR data, determine a point classification and point property estimation for a plurality of sensor data points, cluster a portion of the plurality of sensor data points into an object instance based at least in part on the point classification and point property estimation for the plurality of sensor data points, and output one or more object instance property estimations for the object instance that are determined at least in part from the point classifications and point property estimations for the portion of the plurality of sensor data points clustered into the object instance. Furthermore, the operations can include receiving, as output of the machine-learned detector model, one or more object instance property estimations associated with an object instance detected within the representation of sensor data.

Other example aspects of the present disclosure are directed to other systems, methods, vehicles, apparatuses, tangible non-transitory computer-readable media, and devices for detecting objects. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
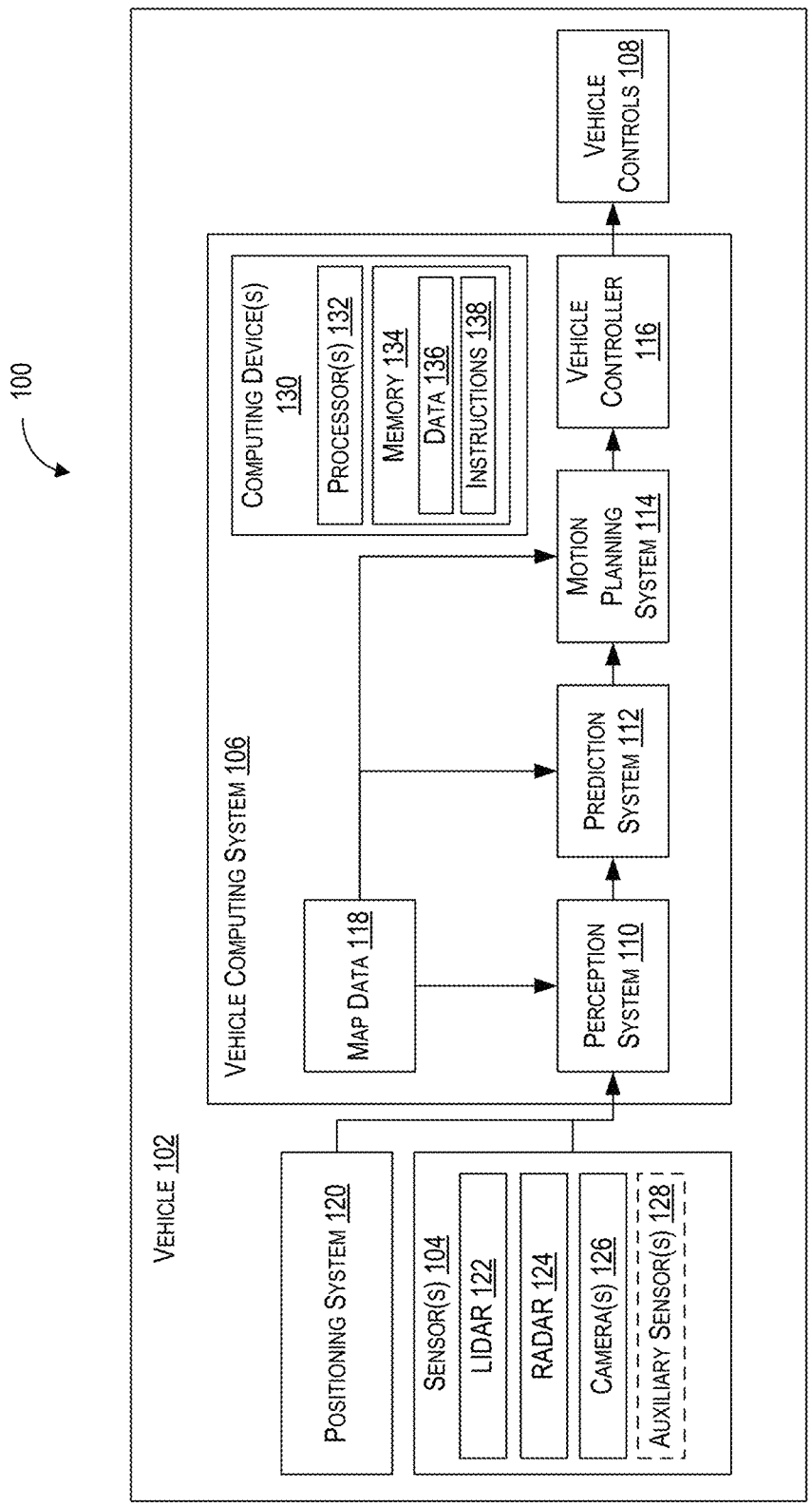
FIG. 1 depicts a block diagram of an example system for controlling the navigation of a vehicle according to example embodiments of the present disclosure.

Generally, the present disclosure is directed to detecting, classifying, and tracking objects, such as pedestrians, cyclists, other vehicles (whether stationary or moving), and the like, during the operation of an autonomous vehicle. In particular, in some embodiments of the present disclosure, an object detection system can detect potential objects of interest based at least in part on data provided from one or more sensor systems included in the autonomous vehicle. In some embodiments, the object detection system may use the data with a machine-learned detector model to facilitate the detection of potential objects of interest. For example, the machine-learned detector model can be configured to receive a representation of sensor data and, in response to receipt of the representation of sensor data, determine a point classification and point property estimation for a plurality of sensor data points, cluster a portion of the plurality of sensor data points into an object instance based at least in part on the point classification and point property estimation for the plurality of sensor data points, and output one or more object instance property estimations for the object instance that are determined at least in part from the point classifications and point property estimations for the portion of the plurality of sensor data points clustered into the object instance. By providing a lightweight method for regressing object instance properties, an object detection system according to embodiments of the present disclosure can detect objects of interest in autonomous vehicle applications with increased speed and accuracy.

More particularly, in some embodiments of the present disclosure, an autonomous vehicle can include one or more ranging systems as part of a sensor system, such as, for example, a Light Detection and Ranging (LIDAR) system and/or a Radio Detection and Ranging (RADAR) system. The one or more ranging systems can capture a variety of ranging data and provide it to a vehicle computing system, for example, for the detection, classification, and tracking of objects of interest during the operation of the autonomous vehicle. Additionally, in some embodiments, the object detection system can implement LIDAR-based object detection. In particular, in some embodiments, LIDAR-based object detection can include generating a multi-channel data matrix from the LIDAR data and possibly map data for the surrounding environment (or receiving such a multi-channel data matrix from other autonomous vehicle applications) and inputting the multi-channel data matrix into a machine-learned detector model (e.g., a convolutional neural network). The machine-learned detector model outputs can include one or more object instances including one or more property estimations characterizing the object instances, which can be used in a vehicle computing system of an autonomous vehicle, such as in perception, prediction, motion planning, and vehicle control.

In some embodiments, LIDAR data can be generated from the LIDAR data provided by the sensor system. For example, in some embodiments, the LIDAR data can be generated by a sweep builder to include an approximately 360 degree view of the LIDAR sensor data (e.g., including three-dimensional (3D) LIDAR data points received from an approximately 360 degree horizontal periphery around the autonomous vehicle). Such LIDAR data can be used when generating a multi-channel data matrix.

According to a further aspect of the present disclosure, LIDAR Background Subtraction (LBS) can be applied to LIDAR data to subtract background LIDAR points so as to only produce output on the foreground LIDAR points. In some implementations, there is a greater likelihood of detecting objects of interest within foreground data points as opposed to background data points covering areas such as sky, background objects/structures, and the like. As such, foreground LIDAR data points obtained via LBS techniques can provide improvements to object detection (as well as planning and controlling the operation of an autonomous vehicle). Such use of LBS techniques can improve processing speed as well as overall performance of autonomous vehicle applications and systems.

In some embodiments, the LIDAR data can be used in generating a multi-channel data matrix, for example a multi-channel polar data matrix, to be used as input to a machine-learned detector model. In particular, some embodiments of the present disclosure can include generating a five-channel data matrix based at least in part on the LIDAR data. However, it should be recognized that a multi-channel data matrix, as contemplated in the present disclosure, is not limited to a five-channel data matrix. In other embodiments, a multi-channel data matrix may include a greater or smaller number of data channels, for example, a multi-channel data matrix may include two, three, four, five, or six data channels or more. In some embodiments, map data for the surrounding environment may also be used in generating the multi-channel data matrix. According to an aspect of the present disclosure, each cell in a multi-channel data matrix (e.g., in a five-channel data matrix) can contain at most one LIDAR point. In a case where more than one LIDAR point may fall on a cell of the multi-channel data matrix, the nearest LIDAR point can be selected for the cell because this LIDAR point may affect the vehicle behavior (e.g., vehicle motion planning) the most.

In particular, in some embodiments, five channels included in a multi-channel data matrix can include Range, Height, Intensity, Absence of LIDAR Return, and LBS Foreground. The Range channel can include indications of how far each LIDAR point is from the vehicle (or the LIDAR sensor). The Height channel can include indications of the height above the ground of each LIDAR point. The Intensity channel can include indications of how much energy is received back after a LIDAR beam hits an object (e.g., the energy intensity of the returned ranging signal). In some embodiments, an uncalibrated intensity may be used, while in other embodiments, a calibrated intensity may be used. The Absence of LIDAR Return channel can include an indication or flag of whether there is no LIDAR return for a cell, because not all of the cells in the data matrix may be populated (e.g., where a ranging signal is not reflected back to the sensor from an object). In some implementations, the LBS Foreground channel can include an indication or a flag of whether a LIDAR point is a foreground point remaining after LIDAR Background Subtraction is applied to LIDAR data (e.g., indicating that the machine-learned model should focus more on these points). In some implementations, the LBS Foreground channel can include a set of LIDAR data points having background LIDAR data points (e.g., data points determined as corresponding to background portions within an image) subtracted out so that only foreground LIDAR data points remain in the set.

In some embodiments, the machine-learned detector model can include various models, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

In some implementations, the machine-learned detector model can be configured to receive a representation of sensor data associated with an environment surrounding an autonomous vehicle. The representation of sensor data can include a plurality of sensor data points (e.g., 3D LIDAR data points). In some embodiments, map data may additionally be provided as an input to assist in the object detection. In response to receipt of the representation of sensor data, the machine-learned detector model can be configured to determine a point classification and point property estimation for a plurality of sensor data points. For example, for a plurality of k data points (e.g., pixels in a representation of sensor data), a point-wise classification $Z_k$ can be determined and a point-wise property estimation $X_k$ can be regressed. In some embodiments, the point-wise property estimation can be associated with a variable such as position, heading, size, velocity, and acceleration of the sensor data point. In some implementations, a quality parameter (e.g., variance or the other quantifiable parameter) associated with the point-wise property estimation can additionally or alternatively be determined. Other properties and/or quality parameters associated with the plurality of sensor data points can also be regressed.

In some implementations, the machine-learned detector model can be further configured to cluster a portion of the plurality of the sensor data points into an object instance based at least in part on the point classification and point property estimation for the plurality of sensor data points. For example, sensor data points can be segmented into object instances by allowing each data point to vote for the location of an object. This process results in a set of indices (I)={pixel indices, k}, which corresponds to a collection of point classifications and point property estimations for the portion of the plurality of sensor data points clustered into the object instance.

In some implementations, one or more object instance property estimations for the object instance can be determined at least in part from the set of indices (I), e.g., the collection of point classifications and point property estimations for the portion of the plurality of sensor data points clustered into the object instance. The one or more object instance property estimations can be represented as a variable (Y), where Y is a function of the point classifications, point property estimations and the set of indices for the object instance (e.g., Y=f(Z,X,I)). The one or more object instance property estimations can include one or more of an instance center, an orientation, and/or one or more dimensions (e.g., width, length, height) of a bounding shape (e.g., box, polygon, prism or other 2D or 3D shape) associated with the object instance. The one or more object instance property estimations can be provided as an output of the machine-learned detector model.

In some embodiments, the machine-learned detector model can be configured to determine the one or more object instance property estimations at least in part from a weighted average of the point property estimations for the portion of the plurality of sensor data points clustered into the object instance. For example, an object instance property estimation (Y) can be determined by the following formula:

$$Y = \sum_{k \in \mathcal{Z}} \frac{w_k}{\sum_{\mathcal{Z}} w_j} X_k \quad \text{Weighted Mean},$$

where $w_k$ is a weight determined for each of the plurality of k data points, and where the class indices $\mathcal{Z}$ is represented as:

$$\mathcal{Z} = \{k | k \in \mathcal{I} \text{ and } Z_k = z\}$$

In some implementations, an object detection system (e.g., one including a machine-learned detector model) can be configured to include a variance minimizer. For example, the variance minimizer can be configured to regress the weights ($w_k$) such that a variance of the weighted average (Y) is minimized, as represented below:

$$w_k = \arg\min_{w_k} \text{var}(Y).$$

In other words, a weight for each sensor data point in the portion of the plurality of sensor data points clustered into the object instance that minimizes a variance of the weighted average of the point property estimations for the portion of the plurality of sensor data points clustered into the object instance is determined. In some implementations, the object detection system can be configured to optimize a different quality parameter than variance associated with the object instance property estimation.

In some embodiments, the outputs of the machine-learned detector model can be subjected to post-processing to create object segments and/or polygons, which can then be analyzed further in a perception system, such as for object classification and tracking. For example, in some implementations, the one or more object instance property estimations can be used to generate a bounding shape estimation for the object instance based at least in part on the one or more object instance property estimations. Bounding shapes can be two-dimensional (2D) including bounding a box (e.g., a quadrilateral), and/or bounding polygon. Further, bounding shapes can be three-dimensional (3D) including a bounding prism, and/or a bounding orb. In some implementations, a bounding shape confidence score indicative of the predicted accuracy of the bounding shape can additionally or alternatively be determined. In a further step, a filtering step such as non-maxima suppression can be applied, for example, to remove and/or reduce any overlapping bounding shapes determined for a given object instance.

In some implementations, a vehicle computing system can be configured to implement one or more response commands based at least in part on the one or more object instance property estimations output by the machine-learned detector model or other post-processing of such outputs. For example, the vehicle computing system can activate, based at least in part on the one or more object instance property estimations, one or more vehicle systems associated with operation of the vehicle. For example, the vehicle computing system can transmit one or more signals or data to one or more vehicle systems. The one or more signals or data transmitted by the vehicle computing system can cause the one or more vehicle systems to perform one or more operations including activating: one or more communication systems that can exchange (send and/or receive) signals or data with other vehicle systems, other vehicles, or remote computing devices; one or more lighting systems (e.g., one or more headlights, hazard lights, and/or vehicle compartment lights); one or more vehicle safety systems (e.g., one or more collision avoidance systems); one or more notification systems that can generate one or more notifications for passengers of the vehicle (e.g., auditory and/or visual messages about the state or predicted state of the vehicle); braking systems (e.g., slowing the vehicle as the vehicle rounds a corner); propulsion systems (e.g., changing the amount of power that is output from engines and/or motors of the vehicle) that can be used to change the acceleration and/or velocity of the vehicle; and/or steering systems that can change the path, course, and/or direction of travel of the vehicle.

In some implementations, when training a machine-learned detector model to detect objects of interest and generate object instance property estimations for detected objects, a detector training dataset can include a large number of previously obtained representations of sensor data and corresponding labels that describe corresponding objects detected within such sensor data and the associated object instance property estimations for such detected objects.

In one implementation, the detector training dataset can include a first portion of data corresponding to one or more representations of sensor data (e.g., LIDAR data) originating from a LIDAR system associated with an autonomous vehicle. The sensor data (e.g., LIDAR data) can, for example, be recorded while an autonomous vehicle is in navigational operation. The detector training dataset can further include a second portion of data corresponding to labels identifying object instance property estimations corresponding to object instances detected within each portion of input sensor data. In some implementations, the labels can further include at least a bounding shape corresponding to each detected object of interest. The labels included within the second portion of data within the detector training dataset can be manually annotated, automatically annotated, or annotated using a combination of automatic labeling and manual labeling.

In some implementations, to train the detector model, a training computing system can input a first portion of a set of ground-truth data (e.g., the first portion of the detector training dataset corresponding to the one or more representations of sensor data) into the machine-learned detector model to be trained. In response to receipt of such first portion, the machine-learned detector model outputs detected objects and associated object instance property estimations. This output of the machine-learned detector model predicts the remainder of the set of ground-truth data (e.g., the second portion of the detector training dataset). After such prediction, the training computing system can apply or otherwise determine a loss function that compares the object instance property estimations for detected object instances output by the machine-learned detector model to the remainder of the ground-truth data which the detector model attempted to predict. The training computing system then can backpropagate the loss function through the detector model to train the detector model (e.g., by modifying one or more weights associated with the detector model). This process of inputting ground-truth data, determining a loss function, and backpropagating the loss function through the detector model can be repeated numerous times as part of training the detector model. For example, the process can be repeated for each of numerous sets of ground-truth data provided within the detector training dataset.

Advantages can be achieved by using the disclosed model training process wherein the machine-learned detector model is trained in part by determining a loss function that computes error associated with a prediction made by the machine-learned detector model relative to an object instance as opposed to the respective sensor data points. When determining loss functions relative to individual sensor data points, more weight can sometimes be given to object instances that are closer to the sensor system and autonomous vehicle as opposed to those object instances that are farther away. By only computing an error loss function once per object instance as part of the model training process, equal weight can be given to all object instances thereby providing improved normalization over all objects in the available training data.

An autonomous vehicle can include a sensor system as described above as well as a vehicle computing system. The vehicle computing system can include one or more computing devices and one or more vehicle controls. The one or more computing devices can include a perception system, a prediction system, and a motion planning system that cooperate to perceive the surrounding environment of the autonomous vehicle and determine a motion plan for controlling the motion of the autonomous vehicle accordingly. The vehicle computing system can receive sensor data from the sensor system as described above and utilize such sensor data in the ultimate motion planning of the autonomous vehicle.

In particular, in some implementations, the perception system can receive sensor data from one or more sensors (e.g., one or more ranging systems and/or a plurality of cameras) that are coupled to or otherwise included within the sensor system of the autonomous vehicle. The sensor data can include information that describes the location (e.g., in three-dimensional space relative to the autonomous vehicle) of points that correspond to objects within the surrounding environment of the autonomous vehicle (e.g., at one or more times).

For example, an autonomous vehicle sensor system can be mounted on the roof of an autonomous vehicle and can include one or more ranging systems, for example a LIDAR system and/or a RADAR system. The one or more ranging systems can capture a variety of ranging data and provide it to a vehicle computing system, for example, for the detection, localization, classification, and tracking of objects of interest during the operation of the autonomous vehicle.

As one example, for a LIDAR system, the ranging data from the one or more ranging systems can include the location (e.g., in three-dimensional space relative to the LIDAR system) of a number of points (e.g., LIDAR points) that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the ranging data from the one or more ranging systems can include the location (e.g., in three-dimensional space relative to the RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and velocity.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

The perception system can identify one or more objects that are proximate to the autonomous vehicle based on sensor data received from the one or more sensors. In particular, in some implementations, the perception system can determine, for each object, state data that describes a current state of such object. As examples, the state data for each object can describe an estimate of the object's: current location (also referred to as position); current velocity; current heading (which may also be referred to together as velocity); current acceleration; current orientation; size/footprint (e.g., as represented by a bounding shape such as a bounding polygon or polyhedron); class of characterization (e.g., vehicle versus pedestrian versus bicycle versus other); yaw rate; and/or other state information. In some implementations, the perception system can determine state data for each object over a number of iterations. In particular, the perception system can update the state data for each object at each iteration. Thus, the perception system can detect and track one or more objects (e.g., vehicles, bicycles, and/or pedestrians) that are proximate to the autonomous vehicle over time, and thereby produce a presentation of the world around an autonomous vehicle along with its state (e.g., a presentation of the objects of interest within a scene at the current time along with the states of the objects).

The prediction system can receive the state data from the perception system and predict one or more future locations for each object based on such state data. For example, the prediction system can predict where each object will be located within the next 5 seconds, 10 seconds, and/or 20 seconds. As one example, an object can be predicted to adhere to its current trajectory according to its current speed. As another example, other, more sophisticated prediction techniques or modeling can be used.

The motion planning system can determine a motion plan for the autonomous vehicle based at least in part on predicted one or more future locations for the object and/or the state data for the object provided by the perception system. Stated differently, given information about the current locations of objects and/or predicted future locations of proximate objects, the motion planning system can determine a motion plan for the autonomous vehicle that navigates the autonomous vehicle along the determined travel route relative to the objects at such locations.

As one example, in some implementations, the motion planning system can determine a cost function for each of one or more candidate motion plans for the autonomous vehicle based at least in part on the current locations and/or predicted future locations of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

Thus, given information about the current locations and/or predicted future locations of objects, the motion planning system can determine a cost of adhering to a particular candidate pathway. The motion planning system can select or determine a motion plan for the autonomous vehicle based at least in part on one or more cost functions. For example, the motion plan that minimizes the cost function can be selected or otherwise determined. The motion planning system then can provide the selected motion plan to a vehicle controller that controls one or more vehicle controls (e.g., actuators or other devices that control gas flow, steering, braking, and/or other vehicle systems) to execute the selected motion plan.

The systems, methods, vehicles, devices, and non-transitory computer-readable media described herein may provide a number of technical effects and benefits. For example, by detecting objects within sensor data and also simultaneously determining object instance property estimations associated with such objects as described herein, an object detection system according to embodiments of the present disclosure can provide a technical effect and benefit of more accurately detecting objects of interest and thereby improving the classification and tracking of such objects of interest in a perception system of an autonomous vehicle. Object detection can be improved, for example, at least in part by providing a more robust system for effectively estimating instance properties when point-wise instance membership is uncertain. Such improved object detection can be particularly advantageous for use in conjunction with vehicle computing systems for autonomous vehicles. Because vehicle computing systems for autonomous vehicles are tasked with repeatedly detecting and analyzing objects in sensor data for tracking and classification of objects of interest (including other vehicles, cyclists, pedestrians, traffic control devices, and the like) and then determining necessary responses to such objects of interest, improved object detection accuracy allows for faster and more accurate object tracking and classification. Improved object tracking and classification can have a direct effect on the provision of safer and smoother automated control of vehicle systems and improved overall performance of autonomous vehicles.

The disclosed technology can provide an additional technical effect and benefit by incorporating a machine-learned detector model for object detection. A machine-learned detector model can be more readily adjusted (e.g., via retraining on a new and/or modified set of training data) than a rules-based system (e.g., via burdensome, manual rewriting of a set of rules) as the vehicle computing system can be periodically updated to be able to better determine object instance property estimations and related information. This can allow for more efficient modification of the vehicle computing system and a reduction in vehicle downtime.

The disclosed technology can have an additional technical effect and benefit of improved scalability by using a machine-learned detector model to detect objects and to determine object instance property estimations that can be used to generate a bounding shape. In particular, modeling object properties and/or attributes through machine-learned models can greatly reduce the research time needed relative to development of hand-crafted object detection and property determination rules. For example, for manually created object detection rules (e.g., rules conceived and written by one or more people), a rule designer may need to derive heuristic models of how different objects may exhibit different properties and/or attributes in different scenarios. Further, it can be difficult to manually create rules that effectively address all possible scenarios that a vehicle (e.g., an autonomous vehicle) may encounter relative to vehicles and other detected objects. By contrast, the disclosed technology, through use of machine-learned models, can train a model on training data, which can be done at a scale proportional to the available resources of the training system (e.g., a massive scale of training data can be used to train the machine-learned model). Further, the machine-learned models can be readily revised as new training data becomes available. As such, use of a machine-learned model trained on labeled sensor data can provide a scalable and customizable solution to the problem of detecting objects and determining object instance property estimations for those objects.

Furthermore, the disclosed technology can also improve the operational performance and safety of the vehicle by reducing the amount of wear and tear on vehicle components through more gradual adjustments in the vehicle's travel path that can be performed based on the improved speed and accuracy of object detection. For example, more effective object detection and bounding shape generation by the vehicle computing system can allow for smoother vehicle movement that reduces the amount of strain on the vehicle's engine, braking, and/or steering systems, thereby improving vehicle performance and longevity.

The systems and methods described herein may also provide resulting improvements to computing technology tasked with object detection, tracking, and classification. The systems and methods described herein may provide improvements in the speed and accuracy of object detection and classification, resulting in improved operational speed and reduced processing requirements for vehicle computing systems, and ultimately more efficient vehicle control.

With reference now to FIGS. 1-11, example embodiments of the present disclosure will be discussed in further detail. FIG. 1 depicts a block diagram of an example system 100 for controlling the navigation of a vehicle 102 (e.g., an autonomous vehicle, a semi-autonomous vehicle, or a manually driven vehicle) according to example embodiments of the present disclosure. The vehicle 102 can include the capability of sensing its environment and navigating without human input or with limited human input. The vehicle 102 can include a ground-based vehicle (e.g., car, truck, motorcycle, and/or bus), an air-based vehicle (e.g., airplane, drone, helicopter, or other aircraft), or other types of vehicles (e.g., watercraft). The vehicle 102 can be configured to operate in one or more modes including, for example, a fully autonomous operational mode and/or a semi-autonomous operational mode. The fully autonomous (e.g., self-driving) operational mode can be a mode in which the autonomous vehicle can provide driving and navigational operation with minimal and/or no interaction from a human driver present in the vehicle. The semi-autonomous (e.g., driver-assisted) operational mode can be one in which the autonomous vehicle operates with some interaction from a human driver present in the vehicle.

The vehicle 102 can include one or more sensors 104, a vehicle computing system 106, and one or more vehicle controls 108. The vehicle computing system 106 can perform one or more operations including assisting in controlling the vehicle 102. Furthermore, the vehicle computing system 106 can receive sensor data from the one or more sensors 104, and perform one or more operations to determine the state of the environment surrounding the vehicle 102. The vehicle computing system 106 can perform various processing techniques on data collected by the sensors 104, and generate an appropriate motion path through such surrounding environment. The vehicle computing system 106 can control the one or more vehicle controls 108 to operate the vehicle 102 according to the motion path.

The vehicle computing system 106 can include one or more processors 132 and at least one memory device 134. The one or more processors 132 can include any processing device (e.g., a processor core, a microprocessor, an ASIC, a FPGA, a GPU, a controller, and/or a microcontroller) and can include one processor or a plurality of processors that are operatively connected. The memory device 134 can include one or more non-transitory computer-readable storage mediums, including RAM, ROM, EEPROM, EPROM, flash memory devices, magnetic disks, and combinations thereof. The memory device 134 can store data 136 and instructions 138 that are executed by the processor 132 to cause the vehicle computing system 106 to perform operations. In some implementations, the one or more processors 132 and at least one memory device 134 may be included in one or more computing devices, including one or more computing devices 130 that can be located within the vehicle computing system 106.

Furthermore, the vehicle computing system 106 can perform one or more operations including obtaining a representation of sensor data associated with an environment surrounding a vehicle; determining a point classification and point property estimation for each of the plurality of the sensor data points; clustering a portion of the plurality of sensor data points into an object instance based on the point classification and point property estimation for each of the plurality of the sensor data points; determining a collection of point classifications and point property estimations for the portion of the plurality of sensor data points clustered into the object instance; and determining one or more object instance property estimations for the object instance based on the collection of point classifications and point property estimations for the portion of the plurality of sensor data points clustered into the object instance.

In some implementations, vehicle computing system 106 can further be connected to, or include, a positioning system 120. Positioning system 120 can determine a current geographic location of the vehicle 102. The positioning system 120 can be any device or circuitry for analyzing the position of the vehicle 102. For example, the positioning system 120 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position. The position of the vehicle 102 can be used by various systems of the vehicle computing system 106.

As illustrated in FIG. 1, in some embodiments, the vehicle computing system 106 can include a perception system 110, a prediction system 112, and a motion planning system 114 that cooperate to perceive the surrounding environment of the vehicle 102 and determine a motion plan for controlling the motion of the vehicle 102 accordingly.

In particular, in some implementations, the perception system 110 can receive sensor data from the one or more sensors 104 that are coupled to or otherwise included within the vehicle 102. As examples, the one or more sensors 104 can include a Light Detection and Ranging (LIDAR) system 122, a Radio Detection and Ranging (RADAR) system 124, one or more cameras 126 (e.g., visible spectrum cameras, infrared cameras, etc.), and/or auxiliary sensors 128. The sensor data can include information that describes the location of objects within the surrounding environment of the vehicle 102.

As one example, for LIDAR system 122, the sensor data can include the location (e.g., in three-dimensional space relative to the LIDAR system 122) of a number of points that correspond to objects that have reflected a ranging laser. For example, LIDAR system 122 can measure distances by measuring the Time of Flight (TOF) that it takes a short laser pulse to travel from the sensor to an object and back, calculating the distance from the known speed of light.

In some embodiments, the LIDAR system 122 can capture a variety of ranging data and provide it to the vehicle computing system 106, for example, for the detection, classification, and tracking of objects of interest during the operation of the vehicle 102. Additionally, in some embodiments, the vehicle computing system 106 can implement LIDAR-based object detection. In particular, in some embodiments, LIDAR-based object detection can include generating a multi-channel data matrix from the LIDAR data and possibly map data for the surrounding environment (or receiving such a multi-channel data matrix from other autonomous vehicle applications) and inputting the multi-channel data matrix into a machine-learned detector model (e.g., a convolutional neural network including the machine-learned detector model 604). The machine-learned detector model 604 outputs can include one or more object instances including one or more property estimations characterizing the object instances, which can be used in a vehicle computing system 106 of the vehicle 102, to perform one or more operations including perception, prediction, motion planning, and vehicle control.

In some embodiments, LIDAR data can be generated from the LIDAR data provided by the one or more sensors 104 and/or the LIDAR system 122. For example, in some embodiments, the LIDAR data can be generated by the vehicle computing system 106 to include an approximately 360 degree view of the LIDAR sensor data (e.g., including three-dimensional (3D) LIDAR data points received from an approximately 360 degree horizontal periphery around the autonomous vehicle). Such LIDAR data can be used when generating a multi-channel data matrix.

According to a further aspect of the present disclosure, the vehicle computing system 106 can apply a LIDAR Background Subtraction (LBS) to LIDAR data to subtract background LIDAR points so as to only produce output on the foreground LIDAR points. In some implementations, there can be a greater likelihood of detecting objects of interest within foreground data points as opposed to background data points covering areas such as sky, background objects/structures, and the like. As such, foreground LIDAR data points obtained via LBS techniques can provide improvements to object detection (as well as planning and controlling the operation of an autonomous vehicle). Such use of LBS techniques can improve processing speed as well as overall performance of autonomous vehicle applications and systems.

In some embodiments, the vehicle computing system 106 can use the LIDAR data to generate a multi-channel data matrix, for example a multi-channel polar data matrix, to be used as input to a machine-learned detector model. In particular, some embodiments of the present disclosure can include generating a five-channel data matrix based at least in part on the LIDAR data. However, it should be recognized that a multi-channel data matrix, as contemplated in the present disclosure, is not limited to a five-channel data matrix. In other embodiments, a multi-channel data matrix may include a greater or smaller number of data channels, for example, a multi-channel data matrix may include two, three, four, five, or six data channels or more. In some embodiments, map data for the surrounding environment may also be used in generating the multi-channel data matrix. According to an aspect of the present disclosure, each cell in a multi-channel data matrix (e.g., in a five-channel data matrix) can contain at most one LIDAR point. In a case where more than one LIDAR point may fall on a cell of the multi-channel data matrix, the nearest LIDAR point can be selected for the cell because this LIDAR point may affect the vehicle behavior (e.g., vehicle motion planning) the most.

In particular, in some embodiments, five channels included in a multi-channel data matrix can include Range, Height, Intensity, Absence of LIDAR Return, and LBS Foreground. The Range channel can include indications of how far each LIDAR point is from the vehicle (or the LIDAR sensor). The Height channel can include indications of the height above the ground of each LIDAR point. The Intensity channel can include indications of how much energy is received back after a LIDAR beam hits an object (e.g., the energy intensity of the returned ranging signal). In some embodiments, an uncalibrated intensity may be used, while in other embodiments, a calibrated intensity may be used. The Absence of LIDAR Return channel can include an indication or flag of whether there is no LIDAR return for a cell, because not all of the cells in the data matrix may be populated (e.g., where a ranging signal is not reflected back to the sensor from an object). In some implementations, the LBS Foreground channel can include an indication or a flag of whether a LIDAR point is a foreground point remaining after LIDAR Background Subtraction is applied to LIDAR data (e.g., indicating that the machine-learned model should focus more on these points). In some implementations, the LBS Foreground channel can include a set of LIDAR data points having background LIDAR data points (e.g., data points determined as corresponding to background portions within an image) subtracted out so that only foreground LIDAR data points remain in the set.

As another example, for RADAR system 124, the sensor data can include the location (e.g., in three-dimensional space relative to RADAR system 124) of a number of points that correspond to objects that have reflected a ranging radio wave. For example, radio waves (pulsed or continuous) transmitted by the RADAR system 124 can reflect off an object and return to a receiver of the RADAR system 124, giving information about the object's location and speed. Thus, RADAR system 124 can provide useful information about the current speed of an object.

As yet another example, for one or more cameras 126, various processing techniques (e.g., range imaging techniques including, for example, structure from motion, structured light, stereo triangulation, and/or other techniques) can be performed to identify the location (e.g., in three-dimensional space relative to the one or more cameras 126) of a number of points that correspond to objects that are depicted in imagery captured by the one or more cameras 126. Auxiliary sensor systems 128 can identify the location of points that correspond to objects as well.

Thus, the one or more sensors 104 can be used to collect sensor data that includes information that describes the location (e.g., in three-dimensional space relative to the vehicle 102) of points that correspond to objects within the surrounding environment of the vehicle 102.

In addition to the sensor data, the perception system 110 can retrieve or otherwise obtain map data 118 that provides detailed information about the surrounding environment of the vehicle 102. The map data 118 can provide information regarding: the identity and location of different travel ways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that are proximate to the vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the vehicle 102 that navigates the vehicle 102 relative to the objects at such locations.

As one example, in some implementations, the motion planning system 114 can determine a cost function for each of one or more candidate motion plans for the vehicle 102 based at least in part on the current locations and/or predicted future locations of the objects. For example, the cost function can describe a cost (e.g., over time) of adhering to a particular candidate motion plan. For example, the cost described by a cost function can increase when the vehicle 102 approaches a possible impact with another object and/or deviates from a preferred pathway (e.g., a preapproved pathway).

Thus, given information about the current locations and/or predicted future locations of objects, the motion planning system 114 can determine a cost of adhering to a particular candidate pathway. The motion planning system 114 can select or determine a motion plan for the vehicle 102 based at least in part on the one or more cost functions. For example, the candidate motion plan that minimizes the cost function can be selected or otherwise determined. The motion planning system 114 can provide the selected motion plan to a vehicle controller 116 that controls one or more vehicle controls 108 (e.g., actuators or other devices that control gas flow, acceleration, steering, braking, etc.) to execute the selected motion plan.

Each of the perception system 110, the prediction system 112, the motion planning system 114, and the vehicle controller 116 can include computer logic utilized to provide desired functionality. In some implementations, each of the perception system 110, the prediction system 112, the motion planning system 114, and the vehicle controller 116 can be implemented in hardware, firmware, and/or software controlling a general purpose processor. For example, in some implementations, each of the perception system 110, the prediction system 112, the motion planning system 114, and the vehicle controller 116 includes program files stored on a storage device, loaded into a memory, and executed by one or more processors. In other implementations, each of the perception system 110, the prediction system 112, the motion planning system 114, and the vehicle controller 116 includes one or more sets of computer-executable instructions that are stored in a tangible computer-readable storage medium such as RAM hard disk or optical or magnetic media.

Figure 2:
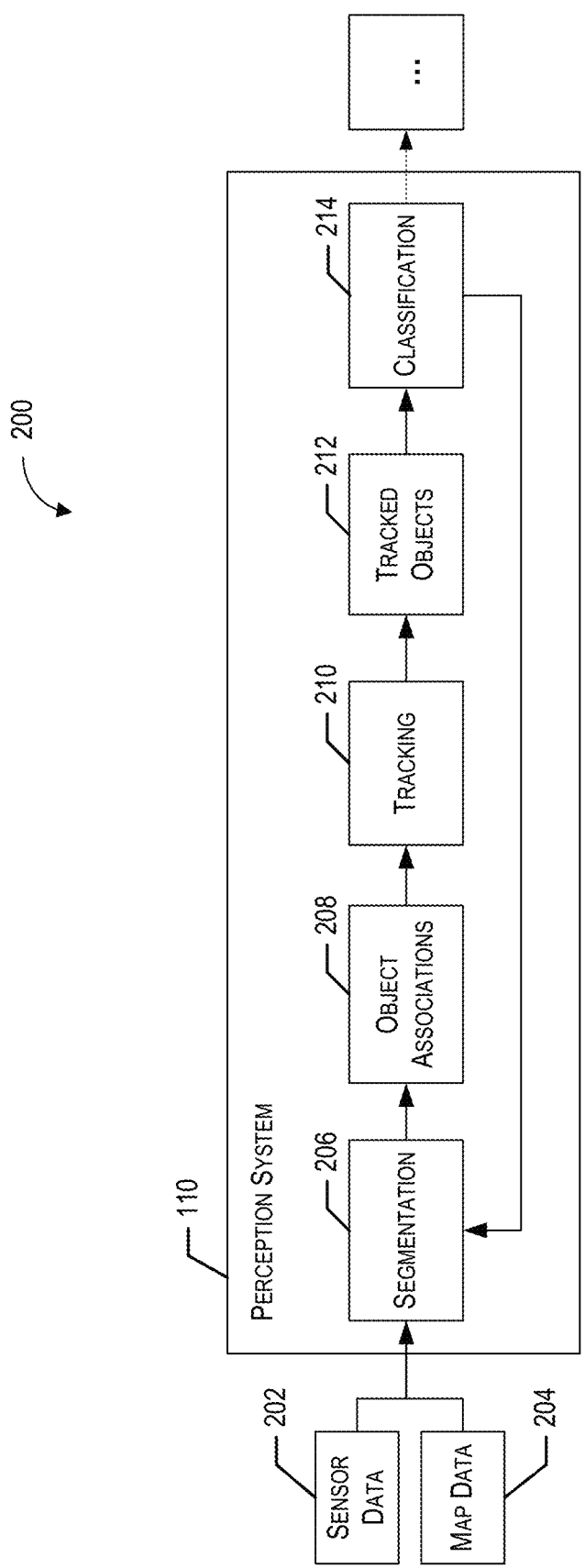
FIG. 2 depicts a block diagram of an example perception system according to example embodiments of the present disclosure.

FIG. 2 depicts a block diagram of an example perception system 200 according to example embodiments of the present disclosure. As discussed in regard to FIG. 1, a vehicle computing system 106 can include a perception system 110 that can identify one or more objects that are proximate to a vehicle 102. In some embodiments, the perception system 110 can include segmentation component 206, object associations component 208, tracking component 210, tracked objects component 212, and classification component 214. The perception system 110 can receive sensor data 202 (e.g., from one or more one or more sensors 104 of the vehicle 102) and map data 204 as input. The perception system 110 can use the sensor data 202 and the map data 204 in determining objects within the surrounding environment of the vehicle 102. In some embodiments, the perception system 110 iteratively processes the sensor data 202 to detect, track, and classify objects identified within the sensor data 202. In some examples, the map data 204 can be used to localize the sensor data to positional locations within a map or other reference system.

Within the perception system 110, the segmentation component 206 can process the sensor data 202 and the map data 204 that is received in order to determine potential objects within the surrounding environment, for example using one or more object detection systems. The object associations component 208 can receive data about the determined objects and analyze prior object instance data to determine a most likely association of each determined object with a prior object instance, or in some cases, determine if the potential object is a new object instance. The tracking component 210 can determine the current state of each object instance, for example, in terms of its current position, velocity, acceleration, heading, orientation, uncertainties, and/or the like. The tracked objects component 212 can receive data regarding the object instances and their associated state data and determine object instances to be tracked by the perception system 110. The classification component 214 can receive the data from tracked objects component 212 and classify each of the object instances. For example, classification component 212 can classify a tracked object as an object from a predetermined set of objects (e.g., a vehicle, bicycle, pedestrian, etc.). The perception system 110 can provide the object and state data for use by various other systems within the vehicle computing system 106, such as the prediction system 112 of FIG. 1.

In some embodiments, the perception system 200 can perform one or more operations including obtaining a representation of sensor data associated with an environment surrounding a vehicle; determining a point classification and point property estimation for each of the plurality of the sensor data points; clustering a portion of the plurality of sensor data points into an object instance based on the point classification and point property estimation for each of the plurality of the sensor data points; determining a collection of point classifications and point property estimations for the portion of the plurality of sensor data points clustered into the object instance; and determining one or more object instance property estimations for the object instance based on the collection of point classifications and point property estimations for the portion of the plurality of sensor data points clustered into the object instance.

Figure 3:
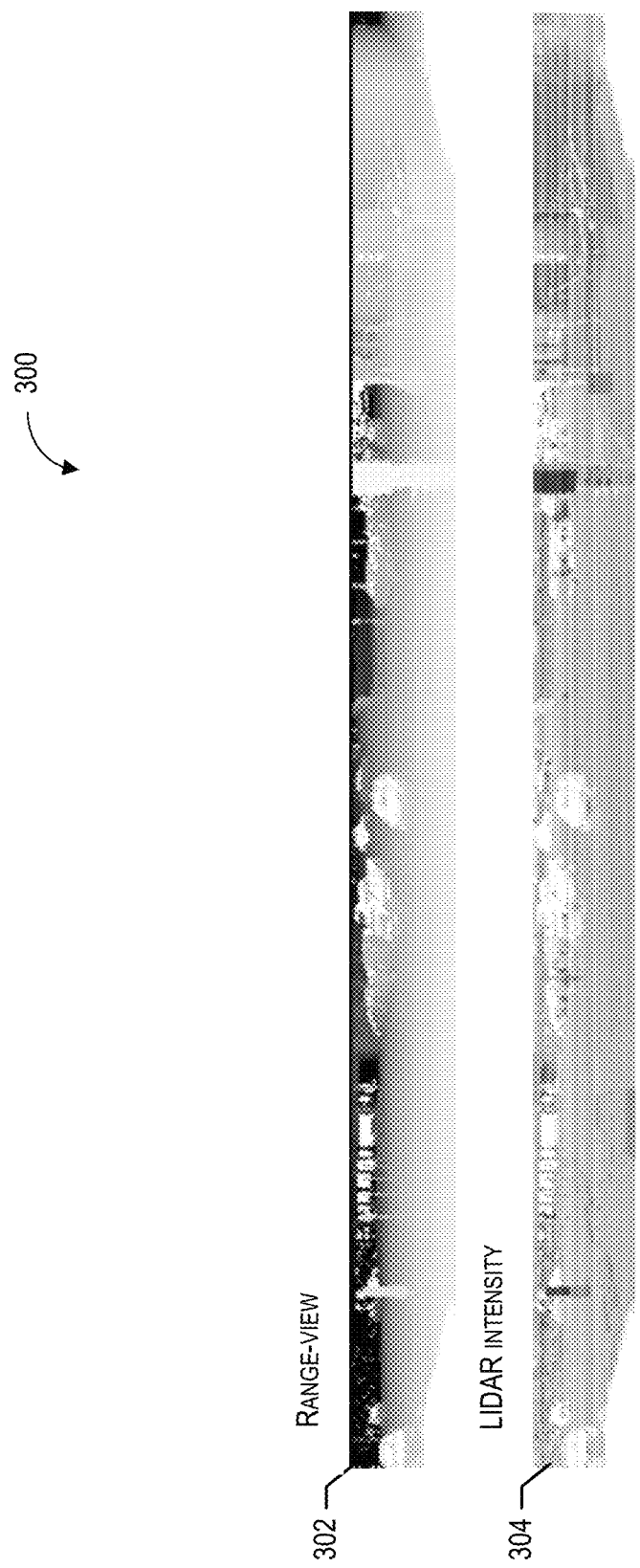
FIG. 3 depicts an example representation of LIDAR sensor data according to example embodiments of the present disclosure.

FIG. 3 depicts an example of LIDAR sensor data 300 according to example embodiments of the present disclosure. In particular, FIG. 3 provides graphical depictions of LIDAR sensor data 300 collected by a LIDAR system, such as LIDAR system 122, of an autonomous vehicle. The LIDAR sensor data 300 can include a variety of ranging data for use in object detection, classification, and/or tracking. For example, the LIDAR sensor data 300 can include the LIDAR range data 302 and/or the LIDAR intensity data 304. In some embodiments, sensor data collected by the LIDAR system 122 can be used to generate LIDAR data, for example by a sweep builder, which can provide a view of the surrounding environment of a vehicle (e.g., the vehicle 102). In some embodiments, such LIDAR data can be generated by a sweep builder and can include an approximately 360 degree view of the LIDAR sensor data 300 from the surrounding environment of the vehicle.

As an example, the LIDAR sensor data 300 can include LIDAR range data 302 which indicates how far away an object is from the LIDAR system 122 (e.g., the distance to an object struck by a ranging laser beam from the LIDAR system 122). The LIDAR range data 302, as illustrated in FIG. 3, depicts LIDAR points generated from a plurality of ranging laser beams being reflected from objects, with each row of the LIDAR range data 302 depicting points generated by each ranging laser beam. In FIG. 3, the LIDAR points in LIDAR range data 302 are depicted using a colorized gray level to indicate the range of the LIDAR data points from the LIDAR system 122, with darker points being at a greater distance or range. As another example, the LIDAR sensor data 300 can also include LIDAR intensity data 304 which indicates how much energy or power is returned to the LIDAR system 122 by the ranging laser beams being reflected from an object. Similar to the LIDAR range data 302, each row of the LIDAR intensity data 304 depicts the returned intensity for each ranging laser beam.

Figure 4:
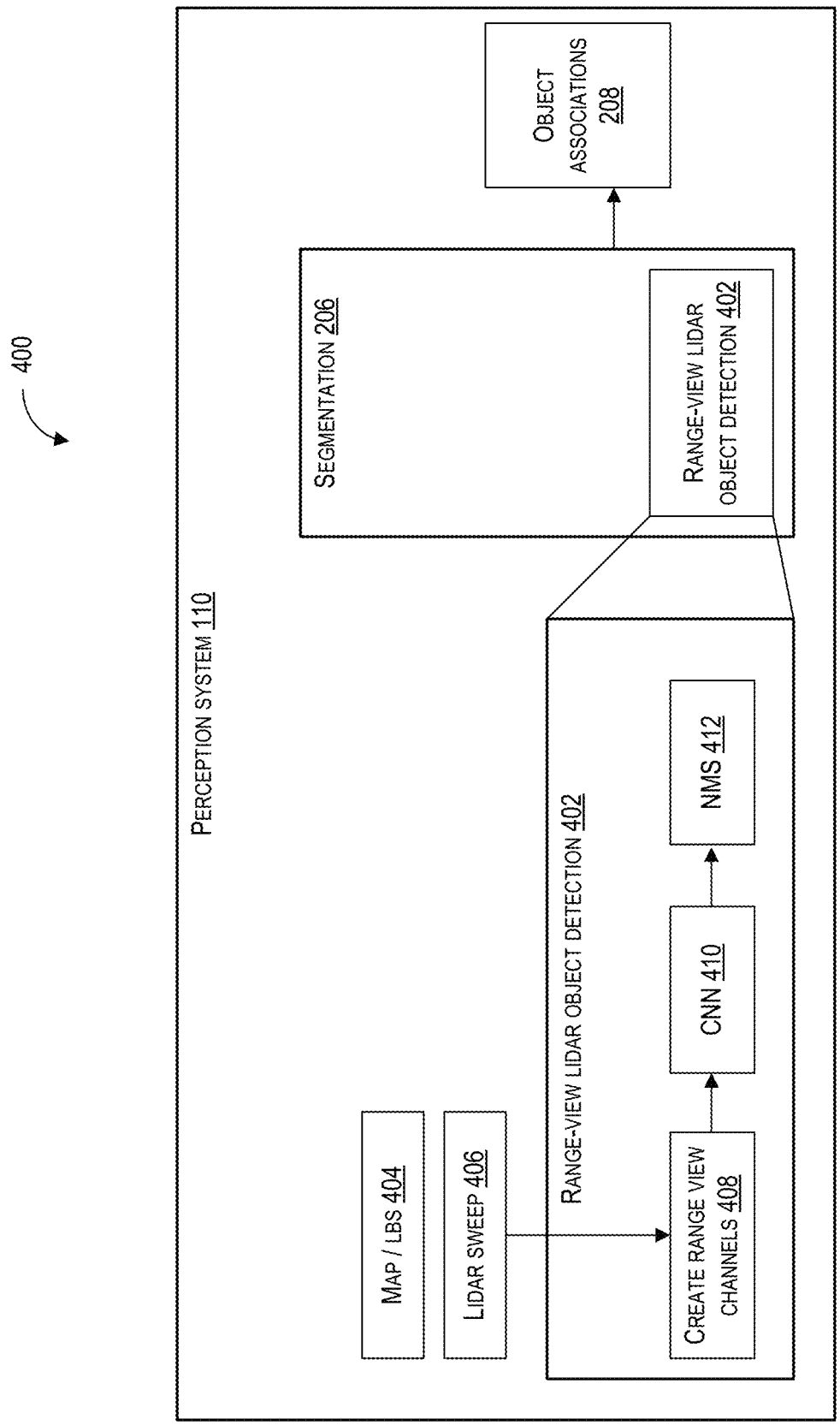
FIG. 4 depicts a block diagram of an example perception system according to example embodiments of the present disclosure.

FIG. 4 depicts a block diagram of an example object detection system 400 in a perception system of an autonomous vehicle according to example embodiments of the present disclosure. In particular, FIG. 4 illustrates an example embodiment of a range-view LIDAR object detection system 402 which provides object detection in a segmentation component (e.g., segmentation component 206 of FIG. 2) of a perception system (e.g. perception system 110 of FIG. 1). As discussed in regard to FIG. 2, the perception system 110 can include a plurality of systems for detecting, classifying, and/or tracking one or more objects, including a segmentation component 206. In some embodiments, the segmentation component 206 can implement one or more object detection systems to detect potential objects of interest based at least in part on data (e.g., LIDAR sensor data, etc.) provided from one or more sensor systems included in the autonomous vehicle. For example, in some embodiments, a LIDAR system of a sensor system (e.g., one or more sensors 104 of FIG. 1) of an autonomous vehicle can generate LIDAR sensor data and provide the LIDAR sensor data to a vehicle computing system of the autonomous vehicle (e.g., vehicle computing system 106 of FIG. 1).

As discussed above, the perception system 110 can receive sensor data and map data (e.g., sensor data 202 and map data 204 of FIG. 2) for use in detecting, classifying, and/or tracking objects within the surrounding environment of an autonomous vehicle (e.g., the vehicle 102 depicted in FIG. 1). In some embodiments, the sensor data can include LIDAR sensor data and the perception system 110 can apply LIDAR Background Subtraction (LBS) to the LIDAR sensor data. In applying LBS, background LIDAR points can be subtracted from the LIDAR sensor data so as to only produce output on the foreground LIDAR points. For example, in some implementations, there can be a greater likelihood of detecting objects of interest within foreground data points as opposed to background data points covering areas including the sky, background objects, background structures, and the like. In some embodiments, the perception system 110 (or another system within vehicle computing system 106 of FIG. 1) can generate LIDAR data based on the LIDAR sensor data. For example, in some embodiments, the LIDAR data can be generated by a sweep builder. In some embodiments, the LIDAR data can include an approximately 360 degree view of the LIDAR sensor data (e.g., including LIDAR data points received from an approximately 360 degree horizontal periphery around the autonomous vehicle).

As illustrated in FIG. 4, the segmentation component 206 can include a range-view LIDAR object detection system 402 to detect potential objects of interest based at least in part on LIDAR sensor data. In some embodiments, the range-view LIDAR object detection system 402 can include one or more range-view data channels 408, a machine-learned model 410, and a post-processing component 412.

Data provided to the components of FIG. 4 can include MAP/LBS data 404 and LIDAR data 406. MAP/LBS data 404 can include, for example, map data 204 that can be used for localizing the position of objects detected by sensor data 202 (e.g., LIDAR sensor data from LIDAR system 122 of FIG. 1) and an LBS filter for selective application on one or more portions of LIDAR data 406. For example LIDAR background subtraction can include determining the persistent static objects that are detected (e.g., buildings, walls, and/or fixed utility structures) in a frame (e.g., a set of LIDAR sensor points at a single time interval) and eliminating those persistent static objects in subsequent frames that include the same persistent static objects. LIDAR data 406 can correspond to an approximately 360 degree field of view of the LIDAR sensor data 300 generated from LIDAR system 122. The range-view LIDAR object detection system 402 can receive the LIDAR data 406 and the MAP/LBS data 404 for use in object detection.

Figure 5:
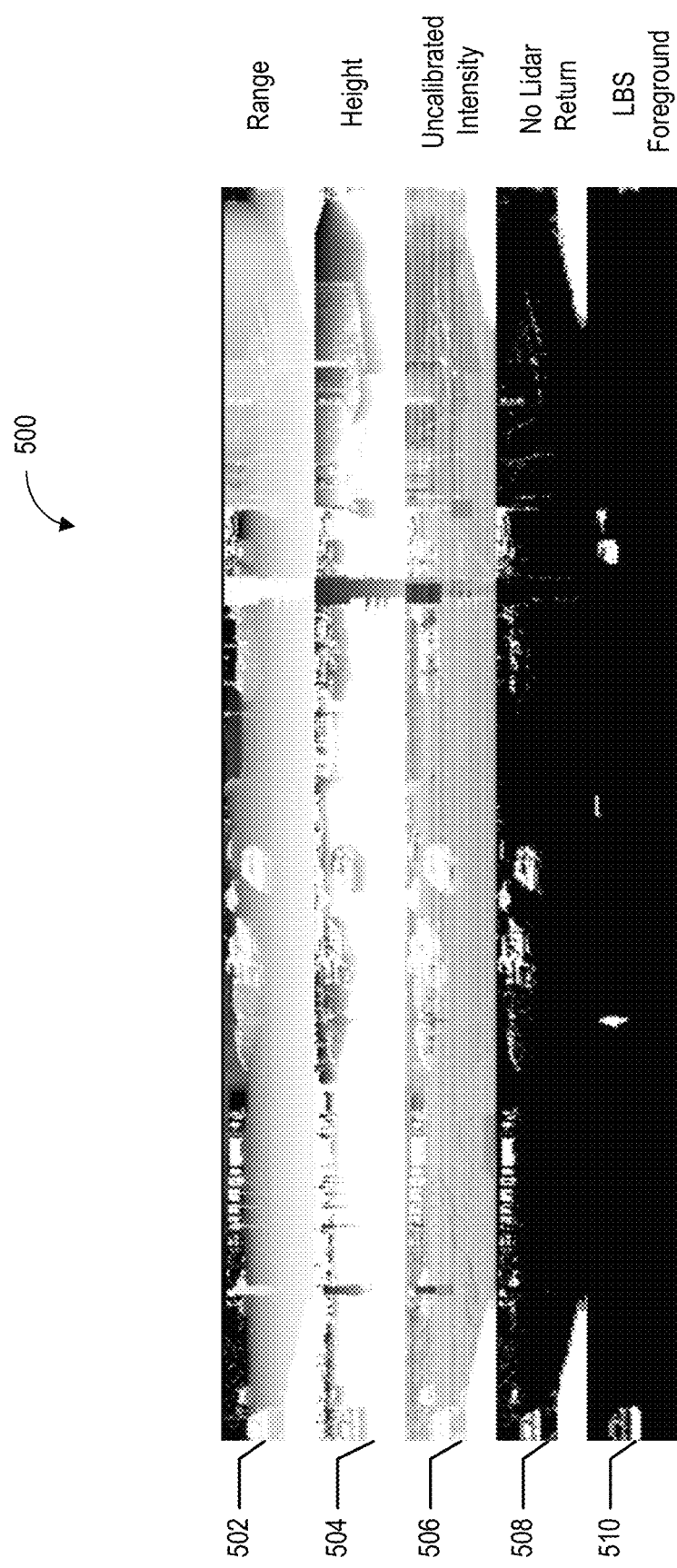
FIG. 5 depicts a multi-channel data matrix representation of sensor data according to example embodiments of the present disclosure.

In some embodiments, the range-view LIDAR object detection system 402 can use the LIDAR data 406 and MAP/LBS data 404 in creating one or more range-view data channels 408, for example generating a multi-channel data matrix, such as a polar data matrix, from the LIDAR data (discussed in further detail with regard to FIG. 5). The range-view LIDAR object detection system 402 can input the one or more range-view data channels 408 (e.g., a multi-channel data matrix) into a machine-learned model 410, such as a neural network or convolutional neural network. The machine-learned model 410 can produce one or more model outputs, including object instance property estimations for each cell of the multi-channel data matrix (e.g., pixel-wise object instance property estimations).

In some embodiments, the range-view LIDAR object detection system 402 can provide the one or more model outputs (e.g., object instance property estimations for cells of the data matrix) to a post-processing component 410 that can generate segmented object candidates (e.g., object segments and/or polygons). The segmented object candidates can include, for example, a bounding shape for each object instance. In some embodiments, the post-processing component 412 can include a plurality of processes, and for example, can include one or more of three processes. In some examples, the post-processing component 412 can predict the segmentation of object instances based on the object instance property estimations (e.g., instance centers). The post-processing component 412 can then estimate a bounding shape for each object instance based on the instance center, the orientation, the height, and the width from the properties estimation. In some examples, the post-processing component 412 can include applying non-maxima suppression (NMS) to remove and/or reduce any overlapping bounding shapes determined for the segmented object candidates. Alternatively, in some embodiments, the post-processing component 412 may include alternate or additional post-processing steps.

The range-view LIDAR object detection system 402 can provide the object segment candidates (e.g., object segments and/or polygons) to the segmentation component 206 such that selected segmented object candidates can be provided to one or more other components implemented in the perception system 110, such as the object associations component 208, for use in tracking and/or classifying objects of interest.

In some embodiments, for example when a plurality of object detection systems are implemented in segmentation component 206, the segmentation component 206 can include a segment selector which receives segmented object candidates from the plurality of object detection systems and determines the most likely segmented object candidates to be provided to other components within the perception system 110 for tracking and classification of the objects.

In some embodiments, the object detection system 400 can perform one or more operations including obtaining a representation of sensor data associated with an environment surrounding a vehicle; determining a point classification and point property estimation for each of the plurality of the sensor data points; clustering a portion of the plurality of sensor data points into an object instance based on the point classification and point property estimation for each of the plurality of the sensor data points; determining a collection of point classifications and point property estimations for the portion of the plurality of sensor data points clustered into the object instance; and determining one or more object instance property estimations for the object instance based on the collection of point classifications and point property estimations for the portion of the plurality of sensor data points clustered into the object instance.

FIG. 5 illustrates an example data matrix 500 for range-view LIDAR object detection according to example embodiments of the present disclosure. In particular, FIG. 5 depicts examples of range-view channels that may be generated by a range-view LIDAR object detection system (such as range-view LIDAR object detection system 402 of FIG. 4) based at least in part on LIDAR sensor data received from a LIDAR system (such as LIDAR system 122 of FIG. 1) of an autonomous vehicle. For example, in some embodiments, LIDAR data can be used in generating one or more range-view channels for use as input to a machine-learned model as part of the range-view LIDAR object detection system (e.g., range-view LIDAR object detection system 402). In some embodiments, map data for the surrounding environment may also be used in generating the one or more range-view channels. In some embodiments, the range-view channels can be implemented by generating a multi-channel data matrix, for example, a multi-channel polar data matrix, based at least in part on the LIDAR sensor data. In some embodiments, each cell in such a multi-channel data matrix can contain at most one LIDAR point. In a case where more than one LIDAR point may fall on a cell of the multi-channel data matrix, the nearest LIDAR point can be selected for the cell because this LIDAR point may affect the vehicle behavior (e.g., vehicle motion planning) the most. In some embodiments, map data for the surrounding environment may also be used in generating the multi-channel data matrix.

In the example embodiment illustrated in FIG. 5, the multi-channel data matrix 500 includes five range-view channels based, at least in part, on the LIDAR sensor data. In particular, in some embodiments, the five channels can include range channel 502, Height channel 504, Intensity channel 506, Absence of LIDAR Return channel 508, and LBS Foreground channel 510. A range channel 502 can include indications of how far each LIDAR point is from the vehicle (or the LIDAR sensor). A Height channel 504 can include indications of the height above the ground of each LIDAR point. An Intensity channel 506 can include indications of how much energy is received back after a LIDAR beam hits an object (e.g., the energy intensity of the returned ranging signal). In some embodiments, an uncalibrated intensity may be used, while in other embodiments, a calibrated intensity may be used for the Intensity channel 506. The Absence of LIDAR Return channel 508 can include an indication or flag of whether there is no LIDAR return in a cell, because, for example, not all of the cells in the data matrix may be populated (e.g., where a ranging signal is not reflected back to the sensor from an object).

In some implementations, the LBS Foreground channel 510 can include an indication or a flag of whether a LIDAR point is a foreground point remaining after LIDAR Background Subtraction is applied to LIDAR data (e.g., indicating that the machine-learned model should focus more on these points). In some implementations, the LBS Foreground channel 510 can include a set of LIDAR data points having background LIDAR data points (e.g., data points determined as corresponding to background portions within an image) subtracted out so that only foreground LIDAR data points remain in the set.

While FIG. 5 illustrates an example five-channel data matrix 500 generated based on LIDAR data, it should be recognized that a multi-channel data matrix in accordance with the present disclosure is not limited to a five-channel data matrix. In other embodiments, a multi-channel data matrix may include a greater or smaller number of data channels, for example, a multi-channel data matrix may include two, three, four, five, or six data channels or more.

Figure 6:
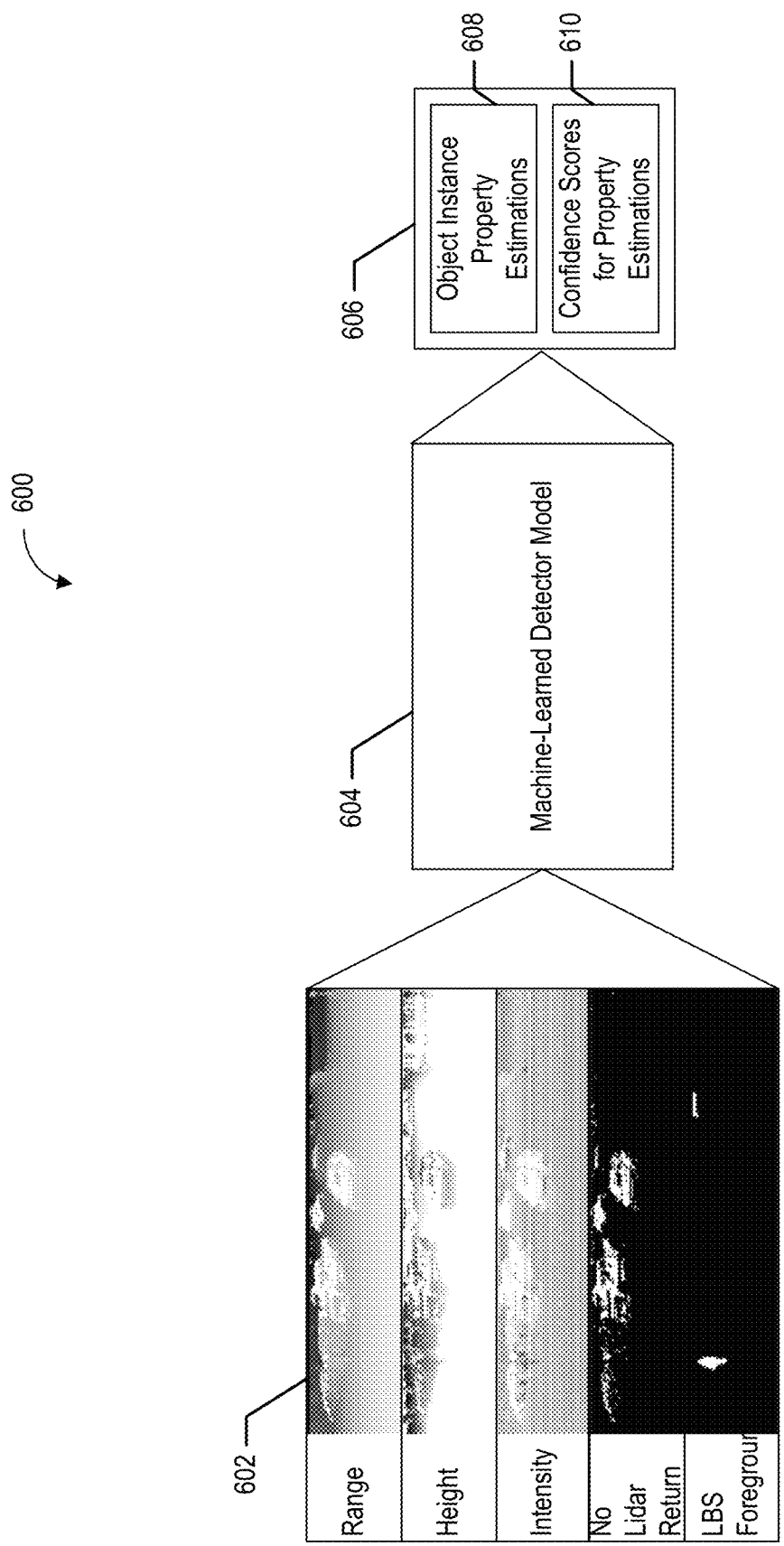
FIG. 6 depicts a block diagram of a machine-learned detector model according to example embodiments of the present disclosure.

FIG. 6 illustrates an example machine learned model for range-view object detection according to example embodiments of the present disclosure. In some embodiments, a range-view LIDAR object detection system 600 depicted in FIG. 6 can include features for use in range-view LIDAR object detection system 402 such as depicted in FIG. 4. Range-view LIDAR object detection system 600 may use range-view data channels as input for a machine-learned model to facilitate the detection of potential objects of interest. For example, the range-view LIDAR object detection system 600 can provide a multi-channel data matrix 602 as input for a machine-learned model 604 (e.g., the machine-learned detector model 604). The multi-channel data matrix 602 may correspond, for example to a five-channel data matrix such as data matrix 500 of FIG. 5 or the multi-channel data matrix 602 may include a greater or smaller number of data channels.

In some embodiments, the machine-learned detector model 604 may be a neural network and, for example, can be a type of feed-forward neural network such as a convolutional neural network. The machine-learned detector model 604 (e.g., convolutional neural network or other neural network) can produce machine-learned model outputs 606. For example, the machine-learned model outputs 606 can be based at least in part on input including the multi-channel data matrix 602 and can include object instance property estimations 608 and/or confidence scores 610 which can be based at least in part on the object instance property estimations 608. The machine-learned model outputs 606 (e.g., object classification predictions and location/orientation predictions) can then be used by the range-view LIDAR object detection system 600 to generate segmented object candidates for use by components implemented in perception system 110, for example. In some embodiments, the machine-learned model outputs 606 (e.g., convolutional neural network outputs) can be subjected to post-processing to create object segments and/or polygons, which can then be analyzed further in perception system 110, such as for object tracking and classification, for example.

In some embodiments, for example when the machine-learned detector model 604 is implemented as a convolutional neural network, such a convolutional neural network can have a residual architecture. Additionally, in some embodiments, such a convolutional neural network can include twenty convolutional layers. Alternatively, in some embodiments, a convolutional neural network can include more or less convolutional layers.

In some implementations, the machine-learned detector model 604 can be configured to receive a representation of sensor data (e.g., the LIDAR data generated by the LIDAR system 122 depicted in FIG. 1) associated with an environment surrounding the vehicle 102. The representation of sensor data can include a plurality of sensor data points (e.g., 3D LIDAR data points). In some embodiments, map data (e.g., the map data 118) may additionally be provided as an input to assist in the object detection. In response to receipt of the representation of sensor data, the machine-learned detector model 604 can be configured to determine a point classification and point property estimation for a plurality of sensor data points. For example, for a plurality of k data points (e.g., pixels in a representation of sensor data), a point-wise classification $Z_k$ can be determined and a point-wise property estimation $X_k$ can be regressed. In some embodiments, the point-wise property estimation can be associated with a variable such as position, heading, size, velocity, and acceleration of the sensor data point. In some implementations, a quality parameter (e.g., variance or the other quantifiable parameter) associated with the point-wise property estimation can additionally or alternatively be determined. Other properties and/or quality parameters associated with the plurality of sensor data points can also be regressed.

In some implementations, the machine-learned detector model 604 can be further configured to cluster a portion of the plurality of the sensor data points into an object instance based at least in part on the point classification and point property estimation for the plurality of sensor data points. For example, sensor data points can be segmented into object instances by allowing each data point to vote for the location of an object. This process results in a set of indices (I)={pixel indices, k}, which corresponds to a collection of point classifications and point property estimations for the portion of the plurality of sensor data points clustered into the object instance.

In some implementations, the machine-learned detector model 604 can determine one or more object instance property estimations 608 for the object instance based at least in part on the set of indices (I), e.g., the collection of point classifications and point property estimations for the portion of the plurality of sensor data points clustered into the object instance. The one or more object instance property estimations 608 can be represented as a variable (Y), where Y is a function of the point classifications, point property estimations and the set of indices for the object instance (e.g., $Y=f(Z,X,I)$). The one or more object instance property estimations 608 can include one or more of an instance center, an orientation, and/or one or more dimensions (e.g., width, length, height) of a bounding shape (e.g., box, polygon, prism or other 2D or 3D shape) associated with the object instance. The one or more object instance property estimations 608 can be provided as an output of the machine-learned detector model 604.

In some embodiments, the machine-learned detector model 604 can be configured to determine the one or more object instance property estimations 608 at least in part from a weighted average of the point property estimations for the portion of the plurality of sensor data points clustered into the object instance. For example, the machine-learned detector model 604 can determine an object instance property estimation (Y) based at least in part on the following formula:

$$Y = \sum_{k \in \mathcal{Z}} \frac{w_k}{\sum_{\mathcal{Z}} w_j} X_k \quad \text{Weighted Mean},$$

where wk is a weight determined for each of the plurality of k data points, and where the class indices $\mathcal{Z}$ is represented as:

$$\mathcal{Z} = \{k | k \in \mathcal{I} \text{ and } Z_k = z\}.$$

In some implementations, the machine-learned detector model 604 can be configured to include a variance minimizer. For example, the variance minimizer can be configured to regress the weights (wk) such that a variance of the weighted average (Y) is minimized, as represented below:

$$w_k = \arg\min_{w_k} \text{var}(Y).$$

In other words, a weight for each sensor data point in the portion of the plurality of sensor data points clustered into the object instance that minimizes a variance of the weighted average of the point property estimations for the portion of the plurality of sensor data points clustered into the object instance is determined. In some implementations, the machine-learned detector model 604 can be configured to optimize a different quality parameter than variance associated with the object instance property estimation.

In some embodiments, the outputs of the machine-learned detector model 604 can be subjected to post-processing to create object segments and/or polygons, which can then be analyzed further in a perception system (e.g., the perception system 112 depicted in FIG. 1), such as for object classification and tracking. For example, in some implementations, the machine-learned detector model 604 can generate a bounding shape estimation for the object instance based at least in part on the one or more object instance property estimations 608. Bounding shapes can be two-dimensional (2D) including bounding a box (e.g., a quadrilateral), and/or bounding polygon. Further, bounding shapes can be three-dimensional (3D) including a bounding prism, and/or a bounding orb. In some implementations, the machine-learned detector model 604 can determine a bounding shape confidence score indicative of the predicted accuracy of the bounding shape. In a further step, the machine-learned detector model 604 can apply a filtering step such as non-maxima suppression to remove and/or reduce any overlapping bounding shapes determined for a given object instance.

In some implementations, the vehicle computing system 106 can be configured to implement one or more response commands based at least in part on the one or more object instance property estimations 608 output by the machine-learned detector model 604 or other post-processing of such outputs. For example, the vehicle computing system 106 can activate, based at least in part on the one or more object instance property estimations 608, one or more vehicle systems associated with operation of the vehicle 102. For example, the vehicle computing system 106 can transmit one or more signals or data to one or more vehicle systems. The one or more signals or data transmitted by the vehicle computing system 106 can cause the one or more vehicle systems to perform one or more operations including activating: one or more communication systems that can send and/or receive signals and/or data with other vehicle systems, other vehicles, or remote computing devices; one or more lighting systems (e.g., one or more headlights, hazard lights, and/or vehicle compartment lights); one or more vehicle safety systems (e.g., one or more collision avoidance systems); one or more notification systems that can generate one or more notifications for passengers of the vehicle (e.g., auditory and/or visual messages about the state or predicted state of the vehicle); braking systems (e.g., slowing the vehicle as the vehicle rounds a corner); propulsion systems (e.g., changing the amount of power that is output from engines and/or motors of the vehicle) that can be used to change the acceleration and/or velocity of the vehicle; and/or steering systems that can change the path, course, and/or direction of travel of the vehicle.

In some implementations, when training a machine-learned detector model 604 to detect objects of interest and generate the object instance property estimations 608 for detected objects, a detector training dataset can include a large number of previously obtained representations of sensor data and corresponding labels that describe corresponding objects detected within such sensor data and the associated object instance property estimations for such detected objects.

In one implementation, the detector training dataset used to train the machine-learned detector model 604 can include a first portion of data corresponding to one or more representations of sensor data (e.g., LIDAR data) originating from a LIDAR system associated with an autonomous vehicle. The sensor data (e.g., LIDAR data) can, for example, be recorded while an autonomous vehicle is in navigational operation. The detector training dataset can further include a second portion of data corresponding to labels identifying the object instance property estimations 608 corresponding to object instances detected within each portion of input sensor data. In some implementations, the labels can further include at least a bounding shape corresponding to each detected object of interest. The labels included within the second portion of data within the detector training dataset can be manually annotated, automatically annotated, or annotated using a combination of automatic labeling and manual labeling.

In some implementations, to train the machine-learned detector model 604, a training computing system can input a first portion of a set of ground-truth data (e.g., the first portion of the detector training dataset corresponding to the one or more representations of sensor data) into the machine-learned detector model 604 to be trained. In response to receipt of such first portion, the machine-learned detector model 604 can output detected objects and associated object instance property estimations. This output of the machine-learned detector model 604 can predict the remainder of the set of ground-truth data (e.g., the second portion of the detector training dataset). After such prediction, the training computing system can apply or otherwise determine a loss function that compares the object instance property estimations 608 for detected object instances output by the machine-learned detector model 604 to the remainder of the ground-truth data that the detector model attempted to predict. The training computing system can then backpropagate the loss function through the machine-learned detector model 604 to train the machine-learned detector model 604 (e.g., by modifying one or more weights associated with the loss function). This process of inputting ground-truth data, determining a loss function, and backpropagating the loss function through the machine-learned detector model 604 can be repeated numerous times as part of training the machine-learned detector model 604. For example, the process can be repeated for each of numerous sets of ground-truth data provided within the detector training dataset.

Advantages can be achieved by using the disclosed model training process wherein the machine-learned detector model 604 is trained in part by determining a loss function that computes error associated with a prediction made by the machine-learned detector model 604 relative to an object instance as opposed to the respective sensor data points. When determining loss functions relative to individual sensor data points, more weight can sometimes be given to object instances that are closer to the sensor system and autonomous vehicle as opposed to those object instances that are farther away. By only computing an error loss function once per object instance as part of the model training process, equal weight can be given to all object instances thereby providing improved normalization over all objects in the available training data.

In some embodiments, the range-view LIDAR object detection system 600 can perform one or more operations including obtaining a representation of sensor data associated with an environment surrounding a vehicle; determining a point classification and point property estimation for each of the plurality of the sensor data points; clustering a portion of the plurality of sensor data points into an object instance based on the point classification and point property estimation for each of the plurality of the sensor data points; determining a collection of point classifications and point property estimations for the portion of the plurality of sensor data points clustered into the object instance; and determining one or more object instance property estimations for the object instance based on the collection of point classifications and point property estimations for the portion of the plurality of sensor data points clustered into the object instance.

Figure 7:
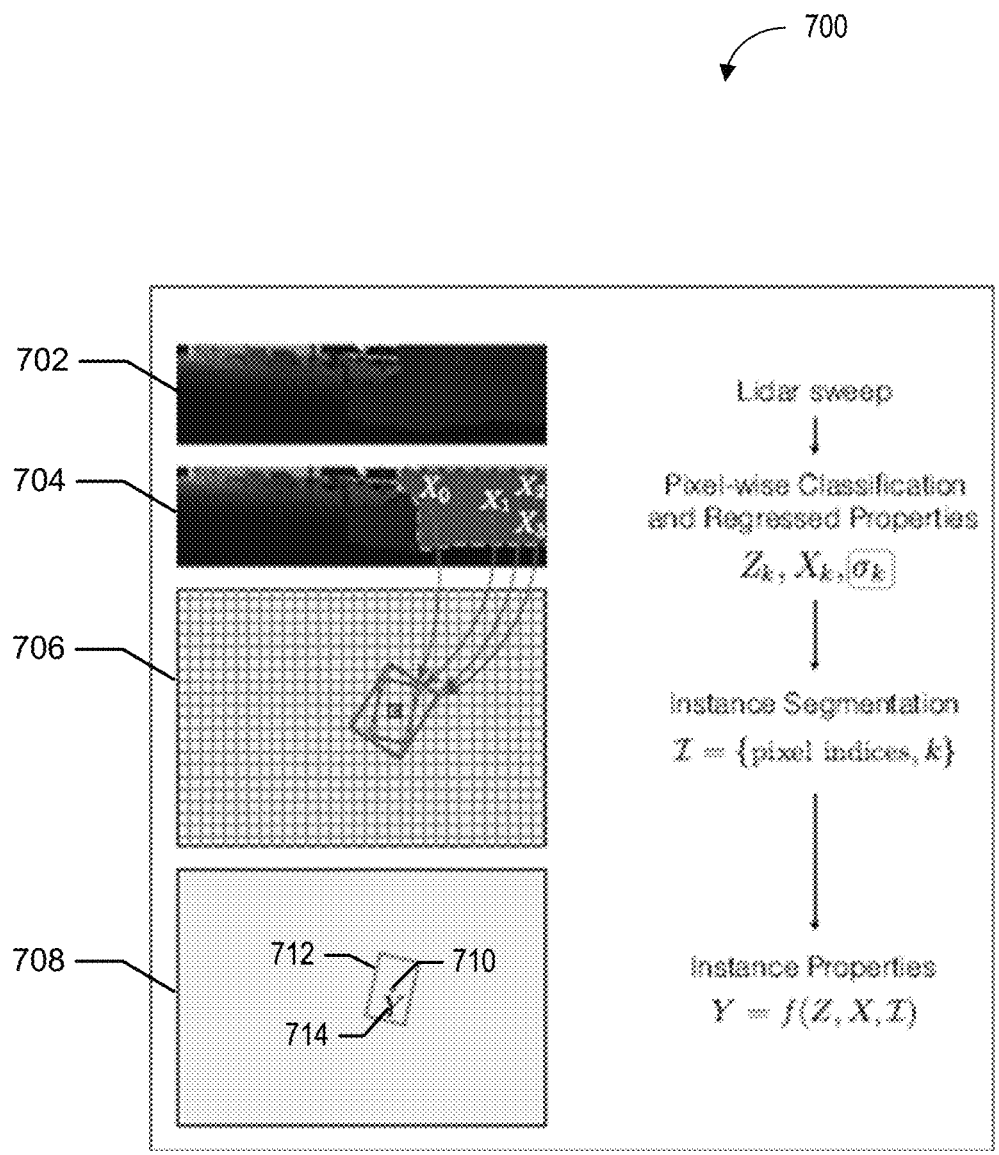
FIG. 7 depicts example aspects of object instance property estimations according to example embodiments of the present disclosure.

FIG. 7 depicts example aspects of object instance property estimations according to example embodiments of the present disclosure. One or more operations associated with a system 700 shown in FIG. 7 can be implemented by one or more devices (e.g., one or more computing devices) or systems including, for example, the vehicle 102, and/or the vehicle computing system 106, shown in FIG. 1. Moreover, one or more operations associated with the system 700 can be implemented as an algorithm on the hardware components of the devices described herein (e.g., as in FIG. 1) to, for example, determine objet instance property estimations. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

As shown in FIG. 7, the system 700 can include a sensor component 702, a classifier and regressor component 704, a segmentation component 706, and instance properties data 708.

The sensor component 702 which can receive sensor data from one or more sensors (e.g., the one or more sensors 104 depicted in FIG. 1). In some embodiments, the sensor data can include the LIDAR data received from the LIDAR system 122 depicted in FIG. 1. The LIDAR sensor data can include information associated with locations of points associated with objects within a surrounding environment of an autonomous vehicle (e.g., data indicating the locations (relative to the LIDAR device) of a plurality of points that correspond to objects that have reflected a ranging laser). Further, in some embodiments, the LIDAR data can be rasterized into a multi-channel image (e.g., a multi-channel image represented by the multi-channel data matrix 602 depicted in FIG. 6).

The classifier and regressor component 704 can perform one or more operations including pixel-wise classification and regression of properties (e.g., physical dimensions, velocity, acceleration, and/or orientation) based at least in part on the plurality of points in the LIDAR data (e.g., the LIDAR data received by the sensor component 702).

Furthermore, a segmentation component 706 can perform one or more operations including instance segmentation based at least in part on the regressed properties determined by the classifier and regressor component 704. For example, the segmentation component 706 can determine the instance properties data 708, which can include a set of instance indices corresponding to a collection of point classifications and point property estimations for the plurality of points.

The instance properties data 708 can include data associated with an object instance center 710 (e.g., data associated with the center of a detected vehicle) for an object instance 714 (e.g., data associated with a detected vehicle) and/or an object instance bounding shape 712 (e.g., data associated with a bounding shape that envelopes a vehicle) for the object instance 714. For example, the instance properties can be denoted as $Y=f\{Z, X, I\}$ in which the instance properties Y are a function of a classification value Z, a regression value X, and an instance value I.

In some embodiments, the system 700 can perform one or more operations including obtaining a representation of sensor data associated with an environment surrounding a vehicle; determining a point classification and point property estimation for each of the plurality of the sensor data points; clustering a portion of the plurality of sensor data points into an object instance based on the point classification and point property estimation for each of the plurality of the sensor data points; determining a collection of point classifications and point property estimations for the portion of the plurality of sensor data points clustered into the object instance; and determining one or more object instance property estimations for the object instance based on the collection of point classifications and point property estimations for the portion of the plurality of sensor data points clustered into the object instance.

Figure 8:
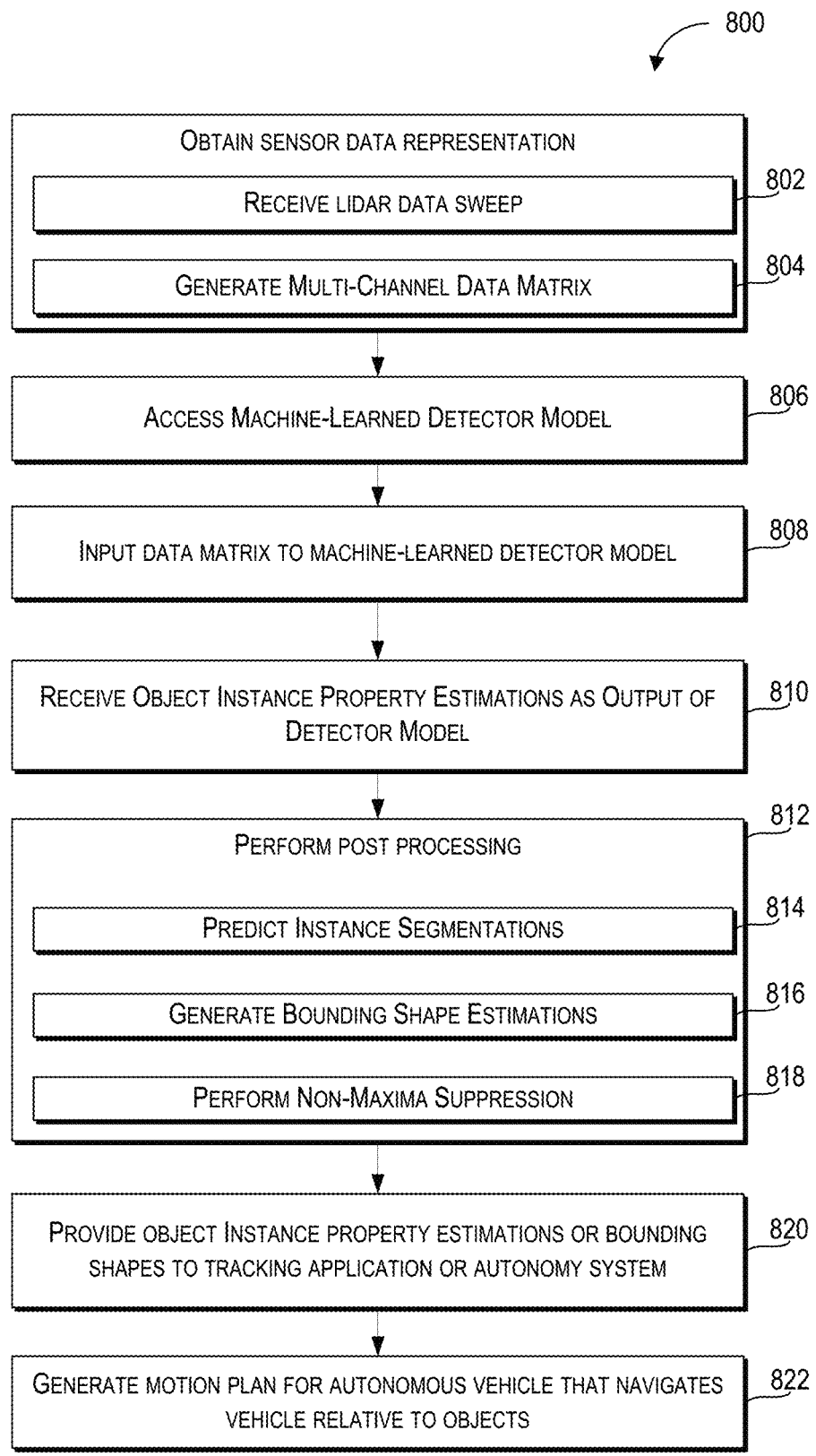
FIG. 8 depicts a flowchart diagram of an example method of detecting objects according to example embodiments of the present disclosure.

FIG. 8 depicts a flow diagram of an example method of autonomous vehicle operation according to example embodiments of the present disclosure. One or more portions of a method 800 can be implemented by one or more devices (e.g., one or more computing devices) or systems including, for example, the vehicle 102 and/or the vehicle computing system 106, which are shown in FIG. 1. Moreover, one or more portions of the method 800 can be implemented as an algorithm on the hardware components of the devices described herein (e.g., as in FIG. 1) to, for example, detect, track, and determine the properties of one or more objects. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 802, the method 800 can include one or more computing devices within a computing system (e.g., the vehicle computing system 106) receiving sensor data which can include LIDAR data. In some embodiments, a perception system implemented in the vehicle computing system 106 (e.g., the perception system 110 of FIG. 1) can generate the LIDAR data received at 802 based at least in part on LIDAR sensor data received from one or more ranging devices included in a sensor system, including the one or more sensors 104 of FIG. 1. The LIDAR sensor data can include data regarding locations of points associated with objects within a surrounding environment of an autonomous vehicle (e.g., data indicating the locations (relative to the LIDAR device) of a number of points that correspond to objects that have reflected a ranging laser). For example, in some embodiments, the LIDAR data received at 802 can be generated by a sweep builder to include an approximately 360 degree view of the LIDAR sensor data (e.g., including LIDAR data points received from an approximately 360 degree horizontal periphery around the autonomous vehicle).

At 804, the method 800 can include one or more computing devices in a computing system (e.g., the vehicle computing system 106 depicted in FIG. 1) generating a multi-channel data matrix based, at least in part, on the LIDAR data. For example, in some embodiments, the perception system 110 implemented in the vehicle computing system 106 can generate a multi-channel data matrix. In some implementations, the multi-channel data matrix can correspond to a multi-channel data matrix including the multi-channel data matrix 500 depicted in FIG. 5 that includes one or more of five different range-view channels, including a range channel, a height channel, an intensity channel, an absence of LIDAR return channel, and an LBS foreground channel.

Furthermore, in some embodiments, range channel can include indications of how far each LIDAR point is from the vehicle (or the LIDAR sensor that emitted the respective LIDAR ranging signal). The height channel can include indications of the height above the ground of each LIDAR point. The intensity channel can include indications of how much energy is received back after a LIDAR beam hits an object (e.g., the energy intensity of the returned ranging signal). In some embodiments, an uncalibrated intensity may be used, while in other embodiments, a calibrated intensity may be used. The absence of LIDAR return channel can include an indication or flag of whether there is no LIDAR return for a cell, because not all of the cells in the data matrix may be populated. For example, a LIDAR ranging signal may absorbed or dispersed by an object such that the LIDAR signal is not reflected in a way that can be used to determine the object's distance from the vehicle. In some implementations, the LBS Foreground channel can include an indication or a flag of whether a LIDAR point is a foreground point remaining after LIDAR Background Subtraction is applied to LIDAR data (e.g., indicating that the machine-learned model should focus more on these points). In some implementations, the LBS Foreground channel can include a set of LIDAR data points that include background LIDAR data points (e.g., data points determined as corresponding to background portions within an image) subtracted out so that only foreground LIDAR data points remain in the set.

At 806, the method 800 can include one or more computing devices in a computing system (e.g., the vehicle computing system 106 depicted in FIG. 1) accessing a machine-learned detector model. For example, the vehicle computing system 106 can access the machine-learned detector model 604 depicted in FIG. 6 and/or the machine-learning computing system 1150 depicted in FIG. 11 which can be stored in the memory device 134 or some other memory device of the vehicle 102. Accessing the machine-learned detector model can include the vehicle computing system 106 establishing a communication channel by which one or more signals or data (e.g., data including the multi-channel data matrix) can be sent to or received from the machine-learned detector model 604.

At 808, the method 800 can include using one or more computing devices within a computing system (e.g., the vehicle computing system 106 depicted in FIG. 1) to input the multi-channel data matrix into a machine-learned detector model, which can include a convolutional neural network. The machine-learned detector model can, for example, generate machine-learned model output data based at least in part on data including the multi-channel data matrix. The machine-learned detector model into which the multi-channel data matrix can be provided as input can correspond, for example, to the machine-learned model 410 depicted in FIG. 4, the machine-learned detector model 604 depicted in FIG. 6, and/or machine-learned model 1130 depicted in FIG. 11.

At 810, the method 800 can include one or more computing devices within a computing system (e.g., the vehicle computing system 106 depicted in FIG. 1) receiving object instance property estimation as a model output. For example, a class prediction received as a model output at 810 can correspond to the class prediction 606 described with reference to FIG. 6. In some embodiments, the object instance property estimation can include a class probability. Further, in some embodiments, the class prediction received as a model output at 810 can, additionally or alternatively, include a confidence score indicative of a determined likelihood that the object instance property estimation is correct (e.g., a higher confidence score can correspond to a higher accuracy).

In some embodiments, the object instance property estimation received as a model output at 810 can include an instance center, an orientation, a width, and a height. Further, in some embodiments, the location estimation width and height can be predictions of the width and height of a box (or other polygon) in which the LIDAR point lies, for example. In some embodiments, the location estimation received as a model output at 810 can include predictions/estimations of one or more properties of the object such as one or more of position, heading, size (e.g., physical dimensions), velocity, and/or acceleration.

At 812, the method 800 can include one or more computing devices within a computing system (e.g., the vehicle computing system 106 depicted in FIG. 1) performing post processing on the machine-learned model outputs to create object segments and/or polygons based on the object instance property estimations.

At 814, the method 800 can include the one or more computing devices within a computing system (e.g., the vehicle computing system 106 depicted in FIG. 1) predicting the segmentation of object instances based at least in part on the object instance property estimations. For example, the vehicle computing system 106 can predict the segmentation of object instances based at least in part on the application of a clustering technique or an edge-detection technique.

At 816, the method 800 can include the one or more computing devices within a computing system (e.g., the vehicle computing system 106 depicted in FIG. 1) generating a bounding shape estimation for each object instance which can be based at least in part on the instance center, the orientation, the height, and/or the width in the object instance property estimations. For example, the vehicle computing system 106 can generate a bounding box that encloses the physical dimensions of an object instance.

At 818, the method 800 can include the one or more computing devices within a computing system (e.g., the vehicle computing system 106 depicted in FIG. 1) performing non-maxima suppression, for example, to remove and/or reduce any overlapping bounding shapes for a segmented object instance. In this way, a segmented object instance can be associated with one corresponding bounding shape.

At 820, the method 800 can include one or more computing devices within a computing system (e.g., the vehicle computing system 106 depicted in FIG. 1) providing the object instance property estimations (e.g., the object segments and/or polygons), for example, for use in tracking and classifying objects of interest in the perception system, tracking system, and/or autonomy system implemented in the vehicle computing system. For example, the object instance property estimations can be provided for use by the perception system 110, the prediction system 112, and/or the motion planning system 114, of the vehicle computing system 106.

At 822, the method 800 can include one or more computing devices within a computing system (e.g., the vehicle computing system 106 depicted in FIG. 1) generating a motion plan for the vehicle. For example, the motion planning system 114 depicted in FIG. 1 can generate a motion plan that includes one or more locations that the vehicle 102 will traverse and/or one or more planned vehicle motion characteristics (e.g., velocity and/or acceleration) of the vehicle 102 at each of the one or more locations.

In some embodiments, generating the motion plan can include the perception system 110 depicted in FIG. 1 identifying one or more objects that are proximate to the vehicle 102 based on sensor data received from the one or more sensors 104. In particular, in some implementations, the perception system 110 can determine, for each of the one or more objects, state data that describes a current state of each object. For example, the state data for each of the one or more objects can describe an estimate of each object's: current location (e.g., current position); current speed; current heading (which may also be referred to together as velocity); current acceleration; current orientation; size/footprint (e.g., as represented by a bounding shape such as a bounding polygon or polyhedron); class of characterization (e.g., vehicle versus pedestrian versus bicycle versus other); yaw rate; and/or other state information. In some implementations, the perception system can determine state data for each of the one or more objects over a number of iterations. In particular, the perception system 110 can update the state data for each object at each iteration. Thus, the perception system 110 can detect and track objects (e.g., vehicles, bicycles, and/or pedestrians) proximate to the vehicle 102 over time, and thereby produce a presentation of the world around the vehicle 102 along with its state (e.g., a presentation of the objects of interest within a scene at the current time along with the states of the objects).

Furthermore, the motion planning system 114 can determine the motion plan for the vehicle 102 based at least in part on one or more predicted future locations of objects external to the vehicle 102 and/or state data for the objects provided by the perception system 110. Based on information about the current locations of objects and/or predicted future locations of proximate objects, the motion planning system 114 can determine the motion plan for the vehicle 102 that will maneuver the vehicle 102 along the determined travel route relative to the objects.

In some implementations, the motion planning system 114 can determine a cost function for each of one or more candidate motion plans for the autonomous vehicle based at least in part on the current locations and/or predicted future locations of the objects. For example, the cost function can describe a cost (e.g., over a plurality of time intervals) of adhering to a particular candidate motion plan. For example, the cost described by a cost function can increase when the autonomous vehicle approaches contact with another object and/or deviates from a preferred pathway (e.g., a predetermined travel route).

In some implementations, a vehicle computing system 106 can be configured to implement one or more response commands based at least in part on the one or more object instance property estimations output by the machine-learned detector model or other post-processing of such outputs. For example, the vehicle computing system 106 can activate, based at least in part on the one or more object instance property estimations, one or more vehicle systems associated with operation of the vehicle 102. For example, the vehicle computing system 106 can transmit one or more signals or data to one or more vehicle systems. The one or more signals or data transmitted by the vehicle computing system 106 can cause the one or more vehicle systems to perform one or more operations including activating: one or more communication systems that can exchange (send and/or receive) signals or data with other vehicle systems, other vehicles, or remote computing devices; one or more lighting systems (e.g., one or more headlights, hazard lights, and/or vehicle compartment lights); one or more vehicle safety systems (e.g., one or more collision avoidance systems); one or more notification systems that can generate one or more notifications for passengers of the vehicle 102 (e.g., auditory and/or visual messages about the state or predicted state of the vehicle 102); braking systems (e.g., slowing the vehicle 102 as the vehicle 102 rounds a corner); propulsion systems (e.g., changing the amount of power that is output from engines and/or motors of the vehicle 102) that can be used to change the acceleration and/or velocity of the vehicle 102; and/or steering systems that can change the path, course, and/or direction of travel of the vehicle 102.

Figure 9:
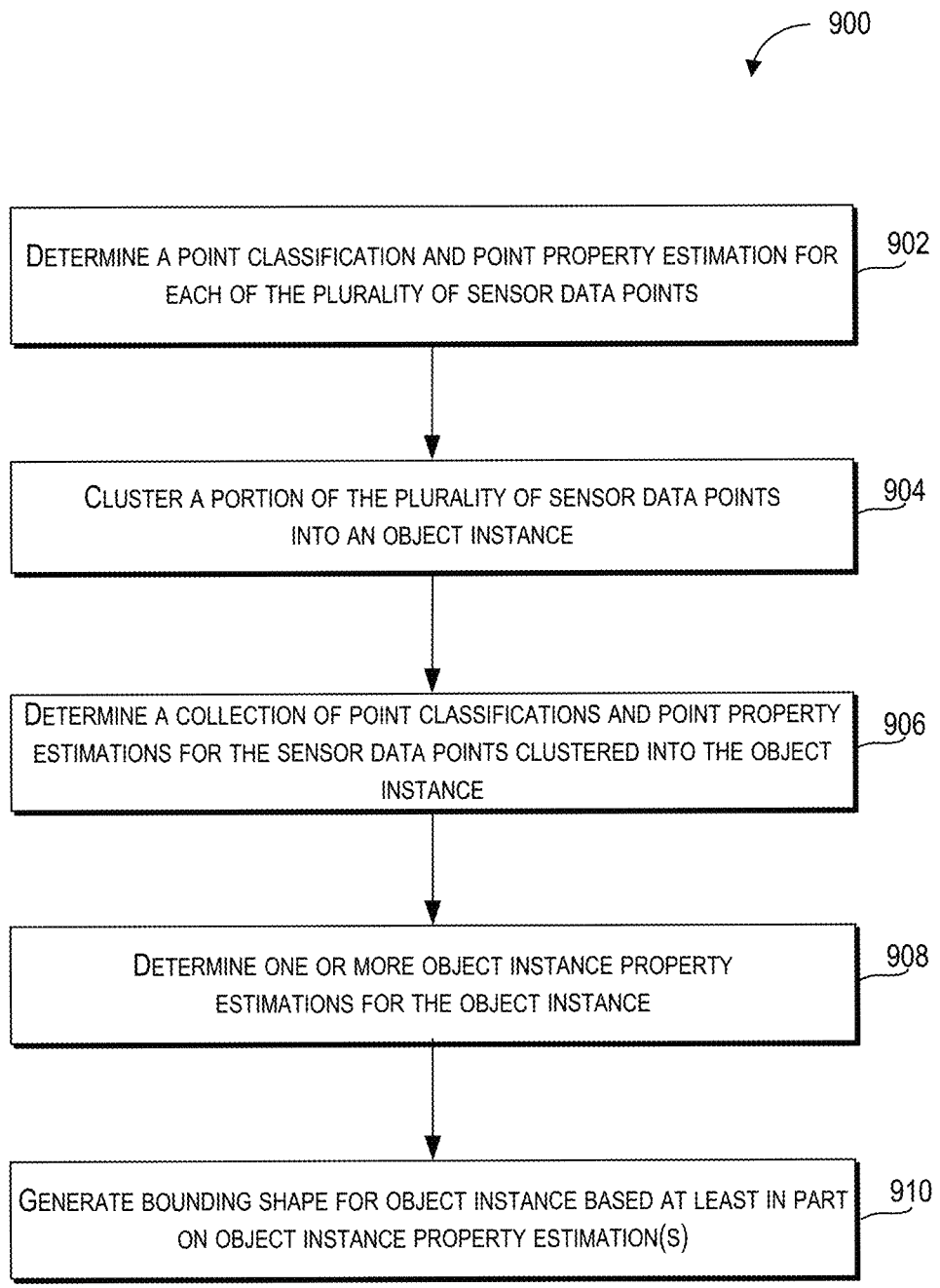
FIG. 9 depicts a flowchart diagram of an example method of determining object instance property estimations according to example embodiments of the present disclosure.

FIG. 9 depicts a flow diagram of an example method of autonomous vehicle operation according to example embodiments of the present disclosure. One or more portions of a method 900 can be implemented by one or more devices (e.g., one or more computing devices) or systems including, for example, the vehicle 102 and/or the vehicle computing system 106, which are shown in FIG. 1. Moreover, one or more portions of the method 900 can be implemented as an algorithm on the hardware components of the devices described herein (e.g., as in FIG. 1) to, for example, detect, track, and determine the properties of one or more objects. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 902, the method 900 can include one or more computing devices within a computing system (e.g., the vehicle computing system 106 depicted in FIG. 1) determining a point classification and point property estimation for each of the plurality of the sensor data points. The representation of sensor data can include a plurality of sensor data points (e.g., 3D LIDAR data points). In some implementations, determining the point classification and point property estimation for each of the plurality of the sensor data points can include sending an input representation of the sensor data points to a machine-learned detector model (e.g., the machine-learned detector model 604 depicted in FIG. 6) that is operational and/or functional on the vehicle computing system 106.

The machine-learned detector model can be configured to receive the input representation of the plurality of the sensor data points and generate an output based at least in part on the input representation. In some embodiments, map data may additionally be provided as an input to assist in object detection by the machine-learned detector model. In response to receiving the representation of sensor data, the machine-learned detector model can be configured to determine a point classification and point property estimation for the plurality of sensor data points. For example, for a plurality of k data points (e.g., pixels in a representation of sensor data), a point-wise classification Zk can be determined and a point-wise property estimation Xk can be regressed. In some embodiments, the point-wise property estimation can be associated with a variable including position, heading, size, velocity, and/or acceleration of the sensor data point. In some implementations, a quality parameter (e.g., variance or another quantifiable parameter) associated with the point-wise property estimation can additionally or alternatively be determined. Other properties and/or quality parameters associated with the plurality of sensor data points can also be regressed.

At 904, the method 900 can include one or more computing devices within a computing system (e.g., the vehicle computing system 106 depicted in FIG. 1) clustering a portion of the plurality of sensor data points into an object instance based at least in part on the point classification and point property estimation for each of the plurality of the sensor data points.

For example, the machine-learned detector model (e.g., the machine-learned detector model of 902 depicted in FIG. 9) can be further configured to cluster a portion of the plurality of the sensor data points into an object instance based at least in part on the point classification and point property estimation for the plurality of sensor data points. Further, sensor data points can be segmented into object instances by allowing each data point to vote for the location of an object. This process results in a set of instance indices (I) which can be expressed as I={pixel indices, k}, which corresponds to a collection of point classifications and point property estimations for the portion of the plurality of sensor data points clustered into the object instance.

At 906, the method 900 can include one or more computing devices within a computing system (e.g., the vehicle computing system 106 depicted in FIG. 1) determining a collection of point classifications and point property estimations for the portion of the plurality of sensor data points clustered into the object instance. For example, the vehicle computing system 106 can determine the one or more object instance property estimations for the object instance based at least in part on the set of instance indices (I) (e.g., the set of instance indices of 904 which can include the collection of point classifications and point property estimations for the portion of the plurality of sensor data points clustered into the object instance). The one or more object instance property estimations can be represented by a variable Y, where Y is a function of the point classifications, point property estimations and the set of indices for the object instance (e.g., Y=f(Z,X,I)). The one or more object instance property estimations can include one or more of an instance center, an orientation, and/or one or more dimensions (e.g., width, length, height) of a bounding shape (e.g., box, polygon, prism, or other 2D or 3D shape) associated with the object instance. Further, the one or more object instance property estimations can be provided as an output of the machine-learned detector model (e.g., the machine-learned detector model of 902 and/or 904, which are depicted in FIG. 9).

At 908, the method 900 can include one or more computing devices within a computing system (e.g., the vehicle computing system 106 depicted in FIG. 1) determining one or more object instance property estimations for the object instance based at least in part on the collection of point classifications and point property estimations for the portion of the plurality of sensor data points clustered into the object instance. For example, the machine-learned detector model of the vehicle computing system 106 can be configured to determine the one or more object instance property estimations at least in part from a weighted average of the point property estimations for the portion of the plurality of sensor data points clustered into the object instance.

Furthermore, an object instance property estimation Y can be determined by the following formula:

$$Y = \sum_{k \in \mathcal{Z}} \frac{w_k}{\sum_{\mathcal{Z}} w_j} X_k \quad \text{Weighted Mean},$$

where wk is a weight determined for each of the plurality of k data points, and where the class indices $\mathcal{Z}$ is represented as:

$$\mathcal{Z} = \{k | k \in \mathcal{I} \text{ and } Z_k = z\}.$$

In some implementations, an object detection system of the vehicle computing system 106 (e.g., an object detection system including the machine-learned detector model) can be configured to include a variance minimizer. For example, the variance minimizer can be configured to regress the weights wk such that a variance of the weighted average Y is minimized, as represented below:

$$w_k = \arg\min_{w_k} \mathrm{var}(Y).$$

In other words, a weight for each sensor data point in the portion of the plurality of sensor data points can be clustered into the object instance that minimizes a variance of the weighted average of the point property estimations for the portion of the plurality of sensor data points clustered into the object instance is determined. In some implementations, the object detection system can be configured to optimize a different quality parameter than variance associated with the object instance property estimation.

At 910, the method 900 can include one or more computing devices within a computing system (e.g., the vehicle computing system 106 depicted in FIG. 1) generating a bounding shape estimation for the object instance based at least in part on the one or more object instance property estimations. For example, the vehicle computing system 106 can generate a bounding shape estimation for the object instance based at least in part on the one or more object instance property estimations. Based on the bounding shape estimation, the vehicle computing system can generate one or more bounding shapes which can include two-dimensional (2D) such as a bounding box, and/or a bounding polygon; or a three-dimensional (3D) shape such as a bounding prism, and/or bounding orb. In some implementations, the vehicle computing system 106 can determine a bounding shape confidence score indicative of the predicted accuracy of the bounding shape.

Figure 10:
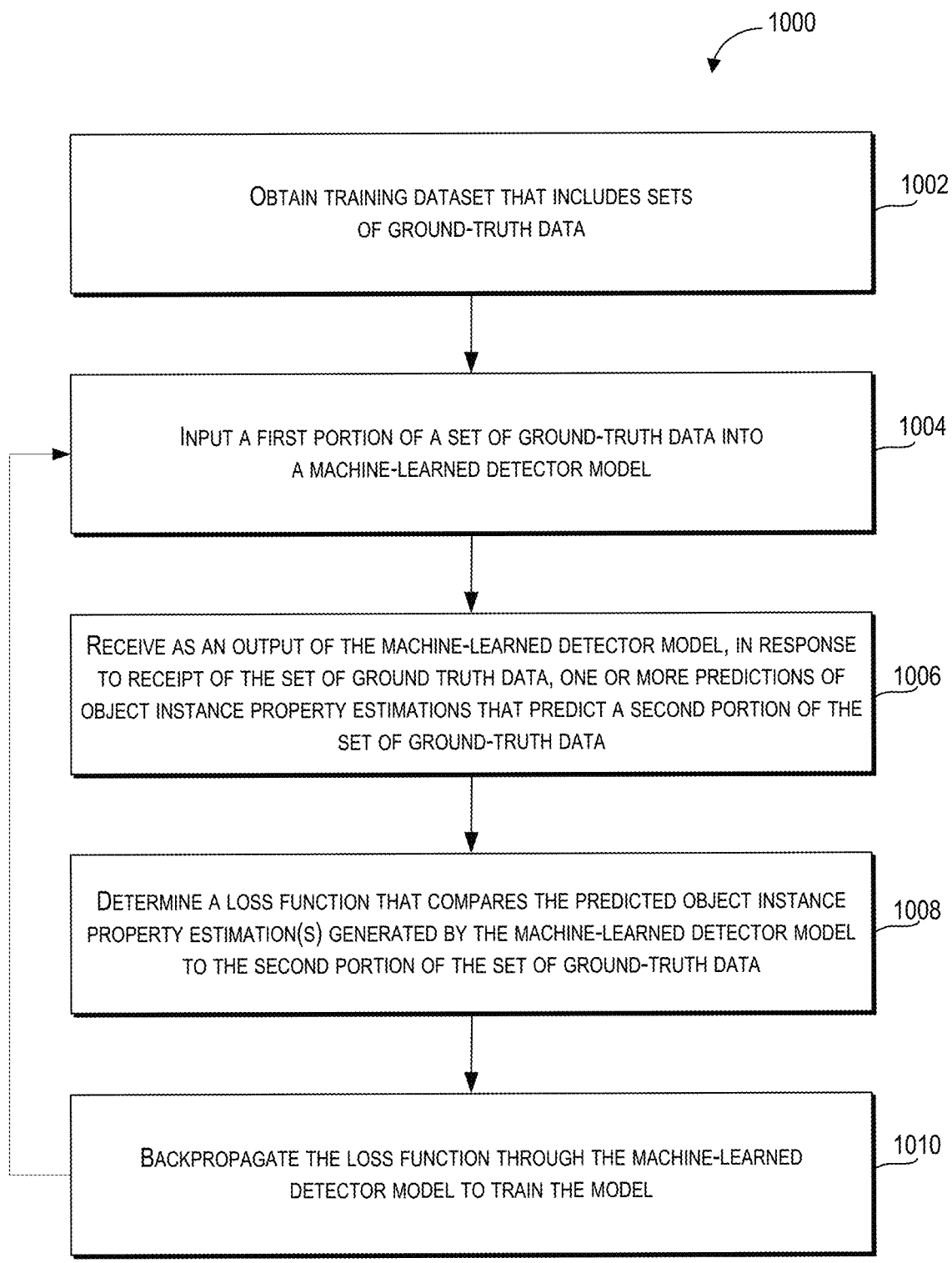
FIG. 10 depicts a flowchart diagram of an example method of training a machine-learned detector model according to example embodiments of the present disclosure.

FIG. 10 depicts a flow diagram of an example method of autonomous vehicle operation according to example embodiments of the present disclosure. One or more portions of a method 1000 can be implemented by one or more devices (e.g., one or more computing devices) or systems including, for example, the vehicle 102 and/or the vehicle computing system 106, which are shown in FIG. 1. Moreover, one or more portions of the method 1000 can be implemented as an algorithm on the hardware components of the devices described herein (e.g., as in FIG. 1) to, for example, detect, track, and determine the properties of one or more objects. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1002, the method 1000 can include one or more computing devices within a computing system (e.g., the vehicle computing system 106 depicted in FIG. 1) obtaining a training dataset. The training dataset can include sets of ground-truth data. For example, the training dataset can include a large number of previously obtained representations of sensor data (e.g., a plurality of sensor data points based on output from a LIDAR device) and corresponding labels that describe corresponding objects detected within such sensor data and the associated object instance property estimations for such detected objects. For example, the training dataset can include sets of sensor data points associated with detected vehicles, pedestrians, buildings, and/or cyclists. Further, each of the sets of data points can be associated with a corresponding object label (e.g., a set of sensor data points for a vehicle is associated with a corresponding vehicle label identifying the set of sensor data points).

At 1004, the method 1000 can include one or more computing devices within a computing system (e.g., the vehicle computing system 106 depicted in FIG. 1) inputting a first portion of a set of ground-truth data (e.g., the first portion of the detector training dataset corresponding to the one or more representations of sensor data) into a machine-learned detector model that is to be trained. For example, the first portion of the set of ground-truth data can include sensor data points associated with a particular class of object (e.g., a vehicle) that the machine-learned detector model will receive.

At 1006, the method 1000 can include one or more computing devices within a computing system (e.g., the vehicle computing system 106 depicted in FIG. 1), responsive to the machine-learned detector model (e.g., the machine-learned detector model of 1004) receiving the first portion of the set of ground-truth data, receiving output including information associated with detected objects and associated object instance property estimations. The output of the machine-learned detector model can be used to predict the remainder of the set of ground-truth data (e.g., the second portion of the detector training dataset).

At 1008, the method 1000 can include one or more computing devices within a computing system (e.g., the vehicle computing system 106 depicted in FIG. 1) determining a loss function that compares the object instance property estimations for detected object instances output by the machine-learned detector model (e.g., the machine-learned detector model of 1004) to the remainder of the ground-truth data which the detector model attempted to predict.

At 1010, the method 1000 can include one or more computing devices within a computing system (e.g., the vehicle computing system 106 depicted in FIG. 1) back-propagating the loss function through the machine-learned detector model (e.g., the machine-learned detector model of 1004) to train the machine-learned detector model (e.g., by modifying one or more weights associated with the machine-learned detector model). Over time, as the machine-learned detector model is further trained, and the weights of the machine-learned detector model are adjusted in accordance with the loss function, the difference between the object instance property estimations and the corresponding ground-truth data will decrease. Further, the method 1000 can continue to train the machine-learned detector model by returning to 1004 and using a different portion of the set of ground-truth data.

Figure 11:
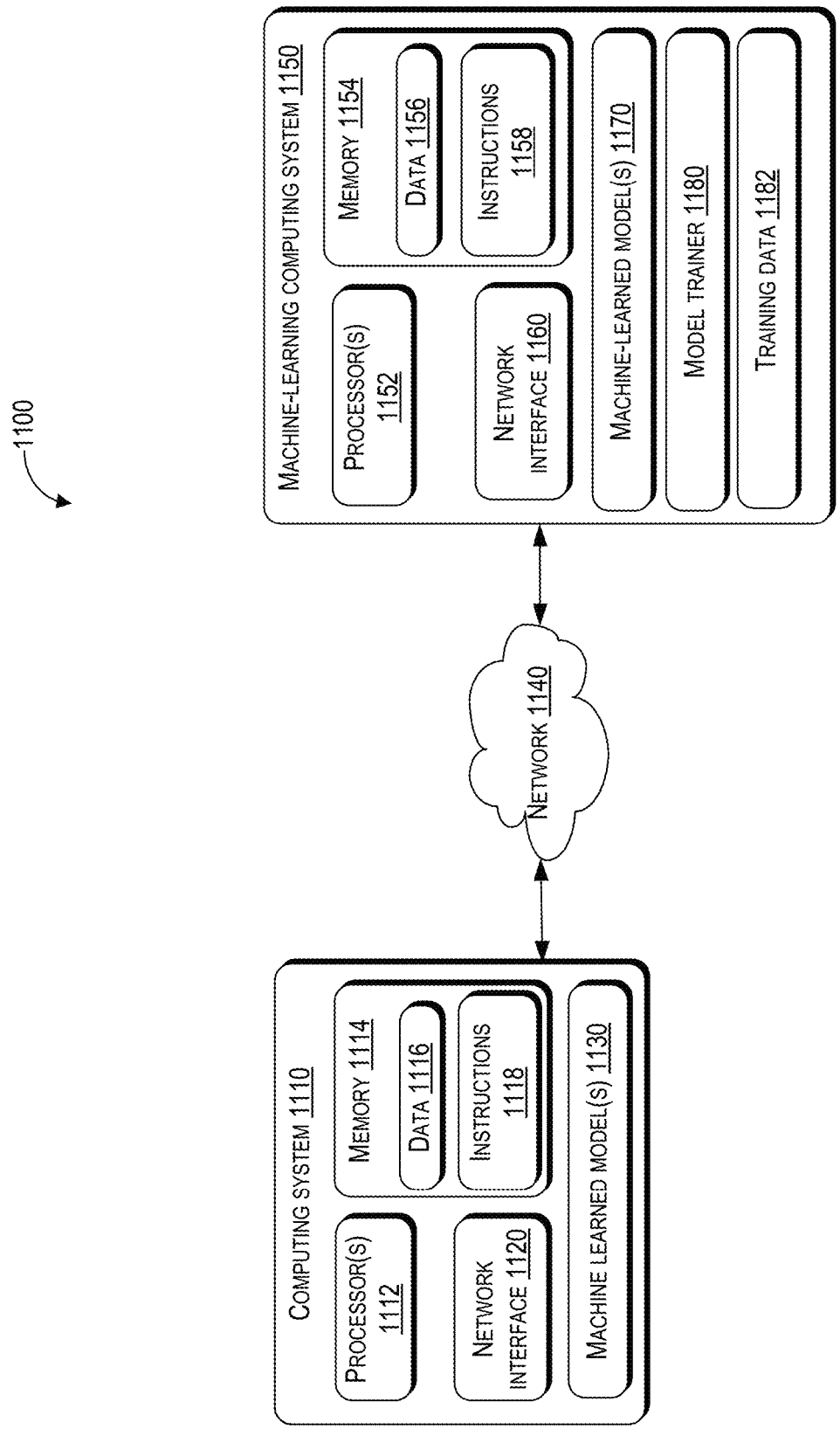
FIG. 11 depicts a block diagram of an example computing system according to example embodiments of the present disclosure.

FIG. 11 depicts a block diagram of an example computing system 1100 according to example embodiments of the present disclosure. The example computing system 1100 includes a computing system 1110 and a machine-learning computing system 1150 that are communicatively coupled over a network 1140. Moreover, the computing system 1100 can include one or more features, functions, devices, elements, and/or components of the system 100 and can perform one or more of the techniques, functions, and/or operations described herein.

In some implementations, the computing system 1110 can perform various operations including obtaining a representation of sensor data associated with an environment surrounding a vehicle; determining a point classification and point property estimation for each of the plurality of the sensor data points; clustering a portion of the plurality of sensor data points into an object instance based on the point classification and point property estimation for each of the plurality of the sensor data points; determining a collection of point classifications and point property estimations for the portion of the plurality of sensor data points clustered into the object instance; and determining one or more object instance property estimations for the object instance based on the collection of point classifications and point property estimations for the portion of the plurality of sensor data points clustered into the object instance.

In some implementations, the computing system 1110 can be included in an autonomous vehicle (e.g., the vehicle 102 depicted in FIG. 1). For example, the computing system 1110 can be on-board the autonomous vehicle. In other implementations, the computing system 1110 is not located on-board the autonomous vehicle. For example, the computing system 1110 can operate offline to perform one or more operations including determining one or more object instance property estimations for an object instance. Further, the computing system 1110 can include one or more distinct physical computing devices.

The computing system 1110 includes one or more processors 1112 and a memory 1114. The one or more processors 1112 can include any suitable processing device (e.g., a processing device including one or more of a processor core, a microprocessor, an application specific integrated circuit (ASIC), a field programmable gate array (FPGA), a controller, and/or a microcontroller) and can include one processor or a plurality of processors that are operatively connected. The memory 1114 can include one or more tangible non-transitory computer-readable storage media, including Random access memory (e.g., RAM), Read-only memory (ROM), electronically erasable programmable read-only memory (EEPROM), erasable programmable read-only memory (EPROM), non-volatile random access memory (NVRAM), one or more memory devices, flash memory devices, and/or any combinations thereof.

The memory 1114 can store information that can be accessed by the one or more processors 1112. For instance, the memory 1114 (e.g., one or more tangible non-transitory computer-readable storage mediums, memory devices) can store data 1116 that can be obtained, received, accessed, written, manipulated, created, and/or stored. The data 1116 can include, for instance, data associated with the state of a vehicle; and/or the state of the environment external to the vehicle (e.g., the state of one or more objects external to the vehicle). In some implementations, the computing system 1110 can obtain data from one or more memory devices that are remote from the computing system 1110.

The memory 1114 can also store computer-readable instructions 1118 that can be executed by the one or more processors 1112. The instructions 1118 can be software written in any suitable programming language or can be implemented in hardware. Additionally, or alternatively, the instructions 1118 can be executed in logically and/or virtually separate threads on the one or more processors 1112.

For example, the memory 1114 can store instructions 1118 that when executed by the one or more processors 1112 cause the one or more processors 1112 to perform any of the operations and/or functions described herein, including, for example, obtaining a representation of sensor data associated with an environment surrounding a vehicle; determining a point classification and point property estimation for each of the plurality of the sensor data points; clustering a portion of the plurality of sensor data points into an object instance based on the point classification and point property estimation for each of the plurality of the sensor data points; determining a collection of point classifications and point property estimations for the portion of the plurality of sensor data points clustered into the object instance; and determining one or more object instance property estimations for the object instance based on the collection of point classifications and point property estimations for the portion of the plurality of sensor data points clustered into the object instance.

According to an aspect of the present disclosure, the computing system 1110 can store or include one or more machine-learned models 1130. As examples, the one or more machine-learned models 1130 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1110 can receive the one or more machine-learned models 1130 from the machine-learning computing system 1150 over the network 1140 and can store the one or more machine-learned models 1130 in the memory 1114. The computing system 1110 can then use or otherwise implement the one or more machine-learned models 1130 (e.g., by the one or more processors 1112).

In some embodiments, the computing system 1110 can implement the one or more machine-learned models 1130 to perform operations including obtaining a representation of sensor data associated with an environment surrounding a vehicle; determining a point classification and point property estimation for each of the plurality of the sensor data points; clustering a portion of the plurality of sensor data points into an object instance based on the point classification and point property estimation for each of the plurality of the sensor data points; determining a collection of point classifications and point property estimations for the portion of the plurality of sensor data points clustered into the object instance; and determining one or more object instance property estimations for the object instance based on the collection of point classifications and point property estimations for the portion of the plurality of sensor data points clustered into the object instance.

The machine-learning computing system 1150 includes one or more processors 1152 and a memory 1154. The one or more processors 1152 can be any processing device (e.g., a processing device including one or more of a processor core, a microprocessor, an ASIC, a FPGA, a controller, and/or a microcontroller) and can be one processor or a plurality of processors that are operatively connected. The memory 1154 can include one or more tangible non-transitory computer-readable storage media, such as RAM, ROM, EEPROM, EPROM, NVRAM, one or more memory devices, flash memory devices, and/or any combinations thereof.

The memory 1154 can store information that can be accessed by the one or more processors 1152. For instance, the memory 1154 (e.g., one or more tangible non-transitory computer-readable storage mediums, memory devices) can store data 1156 that can be obtained, received, accessed, written, manipulated, created, and/or stored. The data 1156 can include, for instance, information associated with a state of objects external to a vehicle (e.g., the vehicle 102) as described herein. In some implementations, the machine-learning computing system 1150 can obtain data from one or more memory devices that are remote from the system 1150.

The memory 1154 can also store computer-readable instructions 1158 that can be executed by the one or more processors 1152. The instructions 1158 can be software written in any suitable programming language or can be implemented in hardware. Additionally, or alternatively, the instructions 1158 can be executed in logically and/or virtually separate threads on the one or more processors 1152.

For example, the memory 1154 can store instructions 1158 that when executed by the one or more processors 1152 cause the one or more processors 1152 to perform any of the operations and/or functions described herein, including, for example, obtaining a representation of sensor data associated with an environment surrounding a vehicle; determining a point classification and point property estimation for each of the plurality of the sensor data points; clustering a portion of the plurality of sensor data points into an object instance based on the point classification and point property estimation for each of the plurality of the sensor data points; determining a collection of point classifications and point property estimations for the portion of the plurality of sensor data points clustered into the object instance; and determining one or more object instance property estimations for the object instance based on the collection of point classifications and point property estimations for the portion of the plurality of sensor data points clustered into the object instance.

In some implementations, the machine-learning computing system 1150 includes one or more server computing devices. In implementations in which the machine-learning computing system 1150 includes multiple server computing devices, such server computing devices can operate according to various computing architectures, including, for example, sequential computing architectures, parallel computing architectures, or some combination thereof.

In addition or alternatively to the one or more machine-learned models 1130 at the computing system 1110, the machine-learning computing system 1150 can include one or more machine-learned models 1170. As examples, the one or more machine-learned models 1170 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine-learning computing system 1150 can communicate with the computing system 1110 according to a client-server relationship. For example, the machine-learning computing system 1150 can implement the one or more machine-learned models 1170 to provide a web service to the computing system 1110. For example, the web service can provide a state of one or more objects external to the vehicle (e.g. the state of object instances).

Further, the one or more machine-learned models 1130 can be located and used at the computing system 1110 and/or one or more machine-learned models 1170 can be located and used at the machine-learning computing system 1150. In some implementations, the machine-learning computing system 1150 and/or the computing system 1110 can train the one or more machine-learned models 1130 and/or the one or more machine-learned models 1170 through use of a model trainer 1180. The model trainer 1180 can train the one or more machine-learned models 1130 and/or the one or more machine-learned models 1170 using one or more training or learning algorithms. One example training technique is backwards propagation of errors. In some implementations, the model trainer 1180 can perform supervised training techniques using a set of labeled training data. In other implementations, the model trainer 1180 can perform unsupervised training techniques using a set of unlabeled training data. The model trainer 1180 can perform a number of generalization techniques to improve the generalization capability of the models being trained. Generalization techniques include weight decays, dropouts, or other techniques.

In particular, the model trainer 1180 can train a machine-learned model 1130 and/or the one or more machine-learned models 1170 based on a set of training data 1182. The training data 1182 can include, for example, a plurality of objects including vehicle objects, pedestrian objects, passenger objects, cyclist objects, road sign objects, road marker objects, traffic light objects, building objects, and/or road objects. The model trainer 1180 can be implemented in hardware, firmware, and/or software controlling one or more processors.

The computing system 1110 can also include a network interface 1120 used to communicate with one or more systems or devices, including systems or devices that are remotely located from the computing system 1110. The network interface 1120 can include any circuits, components, and/or software, for communicating with one or more networks (e.g., the network 1140). In some implementations, the network interface 1120 can include, for example, one or more of a communications controller, receiver, transceiver, transmitter, port, conductors, software and/or hardware for communicating data. Similarly, the machine-learning computing system 1150 can include a network interface 1160.

The network 1140 can be any type of one or more network or combination of networks that allows for communication between devices. In some embodiments, the one or more networks can include one or more of a local area network, wide area network, the Internet, secure network, cellular network, mesh network, peer-to-peer communication link and/or some combination thereof and can include any number of wired or wireless links. Communication over the network 1140 can be accomplished, for instance, via a network interface using any type of protocol, protection scheme, encoding, format, and/or packaging.

FIG. 11 illustrates one example computing system 1100 that can be used to implement the present disclosure. Other computing systems can be used as well. For example, in some implementations, the computing system 1110 can include the model trainer 1180 and the training dataset 1182. In such implementations, the one or more machine-learned models 1130 can be both trained and used locally at the computing system 1110. As another example, in some implementations, the computing system 1110 is not connected to other computing systems.

In addition, components illustrated and/or discussed as being included in one of the computing systems 1110 or 1150 can instead be included in another of the computing systems 1110 or 1150. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
obtaining training data comprising a first portion corresponding to a representation of sensor data comprising a plurality of sensor data points, and a second portion indicative of ground truth data, wherein the ground truth data is indicative of a labeled object instance property estimation that corresponds with an object instance associated with the first portion;

inputting, into a machine-learned detector model, the first portion of the training data, wherein the machine-learned detector model is configured to determine point property estimations for at least a portion of the plurality of sensor data points represented in the first portion of the training data and, based on the point property estimations, determine a predicted object instance property estimation for the object instance;

receiving, as an output of the machine-learned detector model, a training output indicative of the predicted object instance property estimation;

determining a loss based on the training output, wherein the loss is based on a comparison of the predicted object instance property estimation to the labeled object instance property estimation of the ground truth data; and modifying the machine-learned detector model based on the loss.

2. The computer-implemented method of claim 1, wherein the machine-learned detector model is configured to generate the object instance based on the point property estimations.

3. The computer-implemented method of claim 1, wherein modifying the machine-learned detector model based on the loss comprises modifying one or more weights associated with the machine-learned detector model.

4. The computer-implemented method of claim 1, wherein modifying the machine-learned detector model comprises performing a backpropagation for the machine-learned detector model based on the loss.

5. The computer-implemented method of claim 1, wherein the object instance associated with the first portion comprises an object instance for an object that was identified based on the sensor data.

6. The computer-implemented method of claim 1, wherein the labeled object instance property estimation comprise at least a bounding shape corresponding to the object instance associated with the first portion.

7. The computer-implemented method of claim 6, wherein the labeled object instance property estimations are at least (i) manually annotated or (ii) automatically annotated.

8. An autonomous vehicle control system comprising:
one or more processors; and
one or more tangible, non-transitory computer readable media that store instructions that are executable by the one or more processors to cause the autonomous vehicle control system to perform operations, the operations comprising:
obtaining training data comprising a first portion corresponding to a representation of sensor data comprising a plurality of sensor data points, and a second portion indicative of ground truth data, wherein the ground truth data is indicative of a labeled object instance property estimation that corresponds with an object instance associated with the first portion;
inputting, into a machine-learned detector model, the first portion of the training data,
wherein the machine-learned detector model is configured to determine point property estimations for at least a portion of the plurality of sensor data points represented in the first portion of the training data and, based on the point property estimations, determine a predicted object instance property estimation for the object instance;
receiving, as an output of the machine-learned detector model, a training output indicative of the predicted object instance property estimation;
determining a loss based on the training output, wherein the loss is based on a comparison of the predicted object instance property estimation to the labeled object instance property estimation of the ground truth data; and
modifying the machine-learned detector model based on the loss.

9. The autonomous vehicle control system of claim 8, wherein the machine-learned detector model is configured to generate the object instance based on the point property estimations.

10. The autonomous vehicle control system of claim 8, wherein modifying the machine-learned detector model based on the loss comprises modifying one or more weights associated with the machine-learned detector model.

11. The autonomous vehicle control system of claim 8, wherein modifying the machine-learned detector model comprises performing a backpropagation for the machine-learned detector model based on the loss.

12. The autonomous vehicle control system of claim 8, wherein the object instance associated with the first portion comprises an object instance for an object that was identified based on the sensor data.

13. The autonomous vehicle control system of claim 8, wherein the labeled object instance property estimation comprise at least a bounding shape corresponding to the object instance associated with the first portion.

14. The autonomous vehicle control system of claim 13, wherein the labeled object instance property estimations are at least (i) manually annotated or (ii) automatically annotated.

15. One or more tangible, non-transitory computer readable media that store instructions that are executable by one or more processors to cause the one or more processors to perform operations, the operations comprising:
obtaining training data comprising a first portion corresponding to a representation of sensor data comprising a plurality of sensor data points, and a second portion indicative of ground truth data, wherein the ground truth data is indicative of a labeled object instance property estimation that corresponds with an object instance associated with the first portion;
inputting, into a machine-learned detector model, the first portion of the training data,
wherein the machine-learned detector model is configured to determine point property estimations for at least a portion of the plurality of sensor data points represented in the first portion of the training data and, based on the point property estimations, determine a predicted object instance property estimation for the object instance;
receiving, as an output of the machine-learned detector model, a training output indicative of the predicted object instance property estimation;
determining a loss based on the training output, wherein the loss is based on a comparison of the predicted object instance property estimation to the labeled object instance property estimation of the ground truth data; and
modifying the machine-learned detector model based on the loss.

16. The one or more tangible, non-transitory computer readable media of claim 15, wherein the machine-learned detector model is configured to generate the object instance based on the point property estimations.

17. The one or more tangible, non-transitory computer readable media of claim 15, wherein modifying the machine-learned detector model based on the loss comprises modifying one or more weights associated with the machine-learned detector model.

18. The one or more tangible, non-transitory computer readable media of claim 15, wherein modifying the machine-learned detector model comprises performing a backpropagation for the machine-learned detector model based on the loss.

19. The one or more tangible, non-transitory computer readable media of claim 15, wherein the object instance associated with the first portion comprises an object instance for an object that was identified based on the sensor data.

20. The one or more tangible, non-transitory computer readable media of claim 15, wherein the labeled object instance property estimation comprise at least a bounding shape corresponding to the object instance associated with the first portion.

* * * * *